US011445533B2

(12) United States Patent
Yoshimura et al.

(10) Patent No.: US 11,445,533 B2
(45) Date of Patent: Sep. 13, 2022

(54) PUCCH TIMING FOR TERMINAL APPARATUS, BASE STATION APPARATUS, AND COMMUNICATION METHOD IN A WIRELESS COMMUNICATION SYSTEM

(71) Applicants: SHARP Kabushiki Kaisha, Sakai (JP); FG Innovation Company Limited, Tuen Mun (HK)

(72) Inventors: Tomoki Yoshimura, Sakai (JP); Shouichi Suzuki, Sakai (JP); Wataru Ohuchi, Sakai (JP); Liqing Liu, Osaka (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 12 days.

(21) Appl. No.: 16/960,561

(22) PCT Filed: Jan. 9, 2019

(86) PCT No.: PCT/JP2019/000387
§ 371 (c)(1),
(2) Date: Jul. 8, 2020

(87) PCT Pub. No.: WO2019/139049
PCT Pub. Date: Jul. 18, 2019

(65) Prior Publication Data
US 2020/0337077 A1  Oct. 22, 2020

(30) Foreign Application Priority Data
Jan. 10, 2018  (JP) .............................. JP2018-001724

(51) Int. Cl.
*H04W 72/12* (2009.01)
*H04W 72/04* (2009.01)
(Continued)

(52) U.S. Cl.
CPC ....... *H04W 72/1273* (2013.01); *H04L 1/1678* (2013.01); *H04L 1/1812* (2013.01); *H04W 72/042* (2013.01); *H04W 72/0446* (2013.01)

(58) Field of Classification Search
CPC ........... H04W 72/1273; H04W 72/042; H04W 72/0446; H04L 1/1678; H04L 1/1812;
(Continued)

(56) References Cited

U.S. PATENT DOCUMENTS

2016/0044600 A1  2/2016  Kim et al.
2017/0238287 A1  8/2017  Kusashima et al.
(Continued)

FOREIGN PATENT DOCUMENTS

JP   2018001724 A   1/2018
JP   2019121978 A   7/2019
(Continued)

OTHER PUBLICATIONS

"3rd Generation Partnership Project; Technical Specification Group Radio Access Network; NR; Physical layer procedures for data(Release 15)", 3GPP TS 38.214 V15.0.0(Dec. 2017), Jan. 3, 2018.
(Continued)

*Primary Examiner* — Hoang-Chuong Q Vu
(74) *Attorney, Agent, or Firm* — ScienBiziP, P.C.

(57) ABSTRACT

A terminal apparatus includes a receiver configured to receive a PDCCH including a DCI format, and a transmitter configured to transmit a PUCCH. In a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

6 Claims, 10 Drawing Sheets

(51) Int. Cl.
*H04L 1/16* (2006.01)
*H04L 1/18* (2006.01)

(58) Field of Classification Search
CPC ... H04L 1/1671; H04L 1/1864; H04L 1/1854; H04L 1/1896; H04L 5/0055; H04L 5/0007
See application file for complete search history.

(56) References Cited

U.S. PATENT DOCUMENTS

| | | | | |
|---|---|---|---|---|
| 2018/0310257 | A1* | 10/2018 | Papasakellariou | H04W 72/1289 |
| 2018/0367262 | A1* | 12/2018 | Hwang | H04L 1/1861 |
| 2019/0132861 | A1* | 5/2019 | Koorapaty | H04W 76/27 |
| 2019/0149380 | A1* | 5/2019 | Babaei | H04W 72/1268 370/330 |
| 2019/0261397 | A1* | 8/2019 | Takeda | H04L 5/0053 |
| 2019/0268103 | A1* | 8/2019 | Park | H04L 1/18 |
| 2020/0022175 | A1* | 1/2020 | Xiong | H04L 1/1861 |
| 2020/0100273 | A1* | 3/2020 | Gao | H04L 5/001 |

FOREIGN PATENT DOCUMENTS

| | | |
|---|---|---|
| WO | 2014171802 A1 | 10/2014 |
| WO | 2019/139049 A1 | 7/2019 |

OTHER PUBLICATIONS

Official Communication issued in International Patent Application No. PCT/JP2019/000387, dated Feb. 12, 2019.
NTT DOCOMO, "New SID Proposal: Study on New Radio Access Technology", 3GPP TSG RAN Meeting #71, RP-160671, Mar. 7-10, 2016, 8 pages.
"3rd Generation Partnership Project; Technical Specification Group Radio Access Network; NR; Physical layer procedures for control (Release 15)", 3GPP TS 38.213 V15.0 0, Dec. 2017, pp. 1-56.
Convida Wireless, "Design Considerations for BWP in NR", 3GPP TSG-RAN WG1 Meeting #91, R1-1720930, Nov. 27-Dec. 1, 2017, pp. 1-5.
Qualcomm Incorporated,3GPP TSG RAN WG1# 90bis R1-1718581,Oct. 3, 2017.
Ericsson, "Outcome of offline discussion on DCI content", R1-1721642 TSG-RAN WG1 #91, Reno, NV, US, Nov. 27-Dec. 1, 2017.

* cited by examiner

Figure A: Table of number of OFDM symbols per slot $N_{symb}^{slot}$ for subcarrier spacing configuration $\mu$ and normal cyclic prefix

| $\mu$ | $N_{symb}^{slot}$ | slot_configuration | | | | |
|---|---|---|---|---|---|---|
| | | 0 | | | 1 | |
| | | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Figure B: Table of number of OFDM symbols per slot $N_{symb}^{slot}$ for subcarrier spacing configuration $\mu$ and extended cyclic prefix

| $\mu$ | $N_{symb}^{slot}$ | slot_configuration | | | | |
|---|---|---|---|---|---|---|
| | | 0 | | | 1 | |
| | | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 2 | 12 | 40 | 4 | 6 | 80 | 8 |

FIG. 2

<A1>　Set c = 0 – cell index: lower indices correspond to lower RRC indices of corresponding cell.

<A2>　Set m = 0 – PDCCH with first DCI format and/or second DCI format monitoring occasion index: lower index corresponds to earlier PDCCH with first DCI format and/or second DCI format monitoring occasion, or lower index corresponds to earlier PDCCH monitoring occasion within M PDCCH monitoring occasions 1001.

<A3>　Set j = 0

<A4>　Set $V_{temp} = 0$

<A5>　Set $V_{temp2} = 0$

<A6>　Set $V_s = \phi$

<A7>　Set $N_{cells}^{DL}$ to the number of cells configured by higher layers for the UE <A8>　Set M to the number of PDCCH monitoring occasions 1001

<A9>　while m < M

<A10> while c < $N_{cells}^{DL}$

<A11> if there is a PDSCH on serving cell c associated with PDCCH in PDCCH monitoring occasion m, or there is a PDCH indicating downlink SPS release on serving cell c <A12> if $V_{C-DAI,c,m}^{DL} \leq V_{temp}$ <A13> j=j+1

<A14> end if

<A15> $V_{temp} = V_{C-DAI,c,m}^{DL}$

<A16> if $V_{T-DAI,m}^{DL} = \phi$

<A17> $V_{temp2} = V_{C-DAI,c,m}^{DL}$

<A18> else

<A19> $V_{temp2} = V_{T-DAI,m}^{DL}$

FIG. 8

<A20> if the higher layer parameter HARQ-ACK-spatial bundling-PUCCH is not set to TRUE and there is at least one PDCCH monitoring occasion for second DCI format on at least one serving cell in the M PDCCH monitoring occasions for PDCCH with first DCI format and/or second DCI format and the UE is configured by higher layer parameter Number-MCS-HARQ-DL-DCI with reception of two transport blocks in the at least one configured serving cell, <A21> $o^{ACK}(8j+2(V^{DL}_{C\text{-}DAI,c,m}-1)) =$ HARQ-ACK bit corresponding to the first transport block of serving cell c <A22> $o^{ACK}(8j+2(V^{DL}_{C\text{-}DAI,c,m}-1)+1) =$ HARQ-ACK bit corresponding to the second transport block of serving cell c <A23> $V_s = V_s \cup \{8j+2(V^{DL}_{C\text{-}DAI,c,m}-1), 8j+2(V^{DL}_{C\text{-}DAI,c,m}-1)+1\}$ <A24> else if the higher layer parameter HARQ-ACK-spatial bundling-PUCCH is set to TRUE and there is at least one PDCCH monitoring occasion for second DCI format on at least one serving cell in the M PDCCH monitoring occasions for PDCCH with first DCI format and/or second DCI format and the UE is configured by higher layer parameter Number-MCS-HARQ-DL-DCI with reception of two transport blocks in the at least one configured serving cell, <A25> $o^{ACK}(4j+V^{DL}_{C\text{-}DAI,c,m}-1) =$ output bit of binary AND operation of the HARQ-ACK bits corresponding to the first transport block and the second transport block of serving cell c <A26> $V_s = V_s \cup \{4j+V^{DL}_{C\text{-}DAI,c,m}-1\}$ <A27> else <A28> $o^{ACK}(4j+V^{DL}_{C\text{-}DAI,c,m}-1) =$ HARQ-ACK bit of serving cell c <A29> $V_s = V_s \cup \{4j+V^{DL}_{C\text{-}DAI,c,m}-1\}$ <A30> end if <A31> c=c+1

<A32> end while

<A33> m=m+1

<A34> end while

FIG. 9

<A35> if $V_{temp2} < V_{temp}$

<A36> j=j+1

<A37> end if

<A38> if the higher layer parameter HARQ-ACK-spatial bundling-PUCCH is not set to TRUE and there is at least one PDCCH monitoring occasion for second DCI format on at least one serving cell in the M PDCCH monitoring occasions 1001 for PDCCH with first DCI format and/or second DCI format and the UE is configured by higher layer parameter Number-MCS-HARQ-DL-DCI with reception of two transport blocks in the at least one configured serving cell, <A39> $O^{ACK} = 2(4j + V_{temp2})$ <A40> else <A41> $O^{ACK} = 4j + V_{temp2}$ <A42> $o^{ACK}(i) = \text{NACK}$ for any $i \in \{0,1,...,O^{ACK}-1\} \backslash V_x$ <A43> if SPS PDSCH transmission is activated for a UE and the UE is configured to receive SPS PDSCH in a slot within the M PDCCH monitoring occasions 1001

<A44> $O^{ACK} = O^{ACK} + 1$

<A45> $o^{ACK}(o_{ACK-1}) = $ HARQ-ACK bit associated with the SPS PDSCH reception <A46> end if

FIG. 10

PUCCH TIMING FOR TERMINAL APPARATUS, BASE STATION APPARATUS, AND COMMUNICATION METHOD IN A WIRELESS COMMUNICATION SYSTEM

TECHNICAL FIELD

An aspect of the present invention relates to a terminal apparatus, a base station apparatus, and a communication method. The present application claims priority to Japanese Patent Application No. 2018-001724, which is a Japanese patent application filed on Jan. 10, 2018, the contents of which are incorporated herein by reference in their entirety.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as user equipment (UE). LTE is a cellular communication system in which multiple areas are deployed in a cell structure, with each of the multiple areas being covered by a base station apparatus. A single base station apparatus may manage multiple serving cells.

3GPP has been studying a next generation standard (New Radio or NR) (NPL 1) to make a proposal for International Mobile Telecommunication (IMT)-2020, a standard for a next-generation mobile communication system, standardized by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7 to 10 Mar. 2016.

SUMMARY OF INVENTION

Technical Problem

One aspect of the present invention provides a terminal apparatus capable of efficiently performing communication, a communication method used for the terminal apparatus, a base station apparatus capable of efficiently performing communication, and a communication method used for the base station apparatus.

Solution to Problem (1) According to a first aspect of the present invention, the following measures are provided. Specifically, the first aspect of the present invention is a terminal apparatus including: a receiver configured to monitor a PDCCH including a DCI format, and a transmitter configured to transmit an HARQ-ACK on a PUCCH, wherein the terminal apparatus receives a first transport block included in a PDSCH scheduled by the DCI format, the HARQ-ACK is given at least based on a first HARQ-ACK bit corresponding to the first transport block and a second HARQ-ACK bit corresponding to a second transport block, the transmitter generates the second HARQ-ACK bit at least based on some or all of 1) whether at least one serving cell in M PDCCH monitoring occasions includes at least one monitoring occasion for a search space set configured with monitoring of the DCI format or not, 2) a higher layer parameter Number-MCS-HARQ-DL-DCI is set to a prescribed value for the at least one serving cell or not, and/or 3) a value of a higher layer parameter HARQ-ACK-spatial-bundling-PUCCH.

(2) A second aspect of the present invention is a base station apparatus including: a transmitter configured to transmit a PDCCH including a DCI format, and a receiver configured to receive an HARQ-ACK on a PUCCH, wherein the terminal apparatus transmits a first transport block included in a PDSCH scheduled by the DCI format, the HARQ-ACK is given at least based on a first HARQ-ACK bit corresponding to the first transport block and a second HARQ-ACK bit corresponding to a second transport block, the receiver receives the HARQ-ACK at least based on some or all of 1) whether at least one serving cell in M PDCCH monitoring occasions includes at least one monitoring occasion for a search space set configured with monitoring of the DCI format or not, 2) a higher layer parameter Number-MCS-HARQ-DL-DCI is set to a prescribed value for the at least one serving cell or not, and/or 3) a value of a higher layer parameter HARQ-ACK-spatial-bundling-PUCCH.

(3) A third aspect of the present invention is a communication method used for a terminal apparatus, the communication method including the steps of: monitoring a PDCCH including a DCI format, transmitting an HARQ-ACK on a PUCCH, receiving a first transport block included in a PDSCH scheduled by the DCI format, giving the HARQ-ACK at least based on a first HARQ-ACK bit corresponding to the first transport block and a second HARQ-ACK bit corresponding to a second transport block, and generating the second HARQ-ACK bit at least based on some or all of 1) whether at least one serving cell in M PDCCH monitoring occasions includes at least one monitoring occasion for a search space set configured with monitoring of the DCI format or not, 2) a higher layer parameter Number-MCS-HARQ-DL-DCI is set to a prescribed value for the at least one serving cell or not, and/or 3) a value of a higher layer parameter HARQ-ACK-spatial-bundling-PUCCH.

(4) A fourth aspect of the present invention is a communication method used for a base station apparatus, the communication method including the steps of: transmitting a PDCCH including a DCI format, receiving an HARQ-ACK on a PUCCH, transmitting a first transport block included in a PDSCH scheduled by the DCI format, giving the HARQ-ACK at least based on a first HARQ-ACK bit corresponding to the first transport block and a second HARQ-ACK bit corresponding to a second transport block, and receiving the HARQ-ACK at least based on some or all of 1) whether at least one serving cell in M PDCCH monitoring occasions includes at least one monitoring occasion for a search space set configured with monitoring of the DCI format or not, 2) a higher layer parameter Number-MCS-HARQ-DL-DCI is set to a prescribed value for the at least one serving cell or not, and/or 3) a value of a higher layer parameter HARQ-ACK-spatial-bundling-PUCCH.

(5) A fifth aspect of the present invention is a terminal apparatus including: a receiver configured to receive a PDCCH including a DCI format; and a transmitter configured to transmit a PUCCH, wherein in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

(6) A sixth aspect of the present invention is a base station apparatus including: a transmitter configured to transmit a PDCCH including a DCI format; and a receiver configured to receive a PUCCH, wherein in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

(7) A seventh aspect of the present invention is a communication method used for a terminal apparatus, the communication method including the steps of: receiving a PDCCH including a DCI format, and transmitting a PUCCH, wherein in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

(8) An eighth aspect of the present invention is a communication method used for a base station apparatus, the communication method including the steps of: transmitting a PDCCH including a DCI format; and receiving a PUCCH, wherein in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

Advantageous Effects of Invention

According to one aspect of the present invention, the terminal apparatus can efficiently perform communication. In addition, the base station apparatus can efficiently perform communication.

BRIEF DESCRIPTION OF DRAWINGS

FIG. 2 is an example illustrating a relationship between $N^{slot}_{symb}$, a subcarrier spacing configuration μ, a slot configuration, and a CP configuration according to one aspect of the present embodiment.

FIG. 8 is a diagram illustrating an example of configuration of the HARQ-ACK code book 1000 according to one aspect of the present embodiment.

FIG. 9 is a diagram illustrating an example of a procedure for configuration of the HARQ-ACK code book 1000 according to one aspect of the present embodiment.

FIG. 10 is a diagram illustrating an example of a procedure for configuration of the HARQ-ACK code book 1000 according to the one aspect of the present embodiment.

DESCRIPTION OF EMBODIMENTS

Embodiments of the present invention will be described below.

Figure 1:
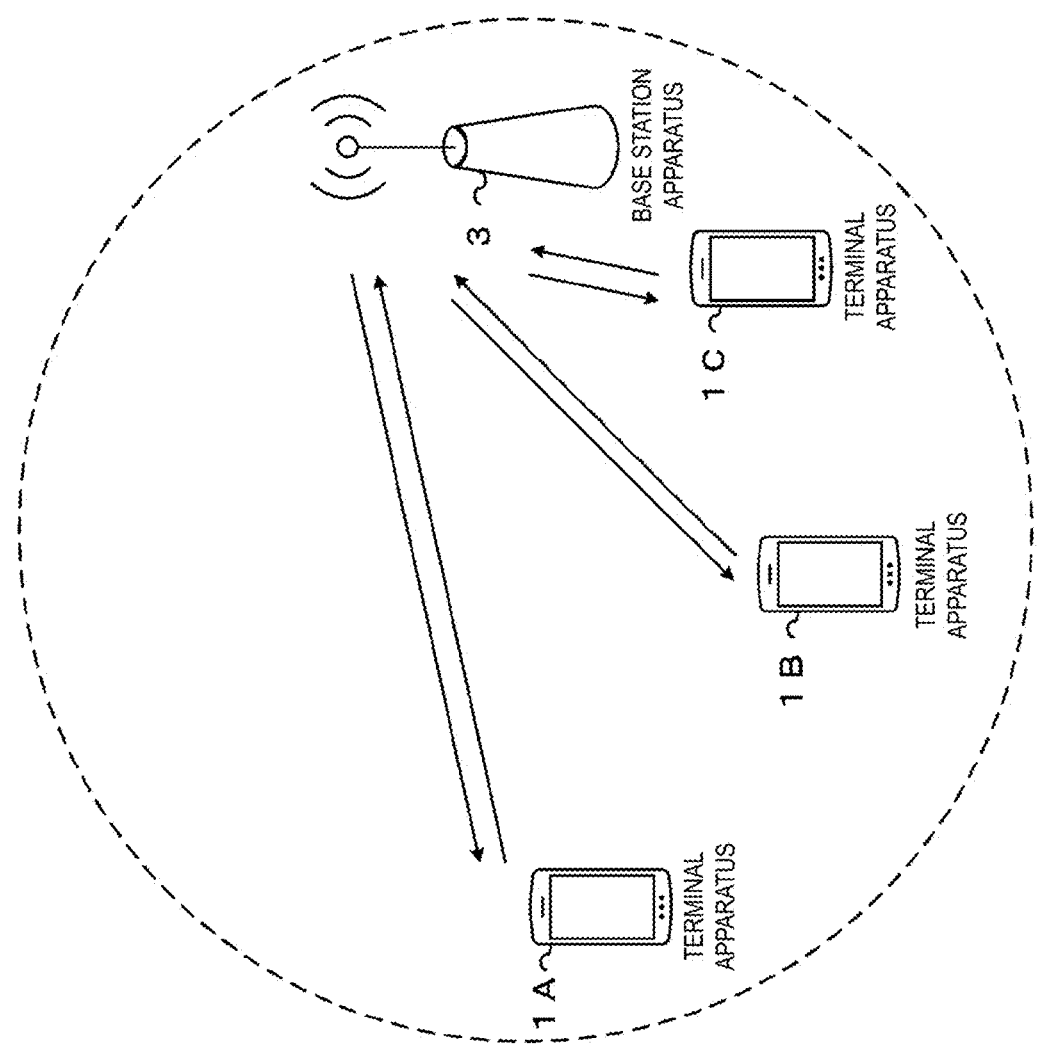
FIG. 1 is a conceptual diagram of a radio communication system according to one aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, the terminal apparatuses 1A to 1C are each also referred to as a terminal apparatus 1.

A subframe configuration will now be described.

In the radio communication system according to an aspect of the present embodiment, at least Orthogonal Frequency Division Multiplexing (OFDM) is used. An OFDM symbol is a unit of an OFDM time domain. The OFDM symbol includes at least one or multiple subcarriers. In generation of a baseband signal, the OFDM symbol is converted into a time-continuous signal.

A SubCarrier Spacing (SCS) may be given by the subcarrier spacing $\Delta f = 2^\mu * 15$ kHz. For example, the subcarrier spacing configuration μ may be configured to be any of 0, 1, 2, 3, 4, and/or 5. For a Carrier bandwidth part (CBP), the subcarrier spacing configuration μ may be given by a higher layer parameter.

In the radio communication system according to an aspect of the present embodiment, a time unit $T_c$ is used for representing the length of the time domain. The time unit $T_c$ may be given by $T_c = 1/(\Delta f_{max} * N_f)$. $\Delta f_{max}$ may be the maximum value of the subcarrier spacing supported by the radio communication system according to one aspect of the present embodiment. $\Delta f_{max}$ may be $\Delta f_{max} = 480$ kHz. $N_f$ may be $N_f = 4096$. A constant κ is $\kappa = \Delta f_{max} * N_f/(\Delta f_{ref} N_{f,ref}) = 64$. $\Delta f_{ref}$ may be 15 kHz. $N_{f,ref}$ may be 2048.

The constant κ may be a value indicating a relationship between a reference subcarrier spacing and $T_c$. The constant κ may be used for a length of a subframe. The number of slots included in the subframe may be given at least based on the constant κ. $\Delta f_{ref}$ is the reference subcarrier spacing, and $N_{f,ref}$ is a value corresponding to the reference subcarrier spacing.

Downlink transmission and/or uplink transmission includes 10-ms frames. A frame includes 10 subframes. A length of the subframe is 1 ms. The length of the subframe may be given independently of the subcarrier spacing Δf. In other words, the frame may be configured independently of μ. The length of the subframe may be given independently of the subcarrier spacing Δf. In other words, the subframe may be configured independently of μ.

For a certain subcarrier spacing configuration μ, the number and indices of slots included in a subframe may be given. For example, a first slot number $n^\mu_s$ may be given in ascending order ranging from 0 to $N^{subframe,\mu}_{slot}-1$ within a subframe. For the subcarrier spacing configuration μ, the number and indices of slots included in a frame may be given. For example, a second slot number $n^{\mu}_{s,f}$ may be given in ascending order ranging from 0 to $N^{frame,\mu}_{slot}-1$ within a frame. $N^{slot}_{symb}$ continuous OFDM symbols may be included in one slot. The $N^{slot}_{symb}$ may be given at least based on some or all of a slot configuration and/or a Cyclic Prefix (CP) configuration. The slot configuration may be given by a higher layer parameter slot_configuration. The CP configuration may be given at least based on a higher layer parameter. The CP configuration may be given at least based on dedicated RRC signaling. The first slot number and the second slot number are also referred to as slot numbers (slot indexes).

FIG. 2 is an example illustrating a relationship between $N^{slot}_{symb}$, the subcarrier spacing configuration μ, a slot configuration, and a CP configuration according to one aspect of the present embodiment. In FIG. 2A, in a case that the slot configuration is 0 and that the subcarrier spacing configuration μ is 2 and that the CP configuration is a normal cyclic prefix (normal CP), $N^{slot}_{symb}=14$, $N^{frame,\mu}_{slot}=40$, and $N^{subframe,\mu}_{slot}=4$. In addition, in FIG. 2B, in a case that the slot configuration is 0 and that the subcarrier spacing configuration μ is 2 and that the CP configuration is an extended cyclic prefix (extended CP), $N^{slot}_{symb}=12$, $N^{frame,\mu}_{slot}=40$, and $N^{subframe,\mu}_{slot}=4$. The $N^{slot}_{symb}$ in the slot configuration 0 may correspond to twice the $N^{slot}_{symb}$ in the slot configuration 1.

Physical resources will be described below.

An antenna port is defined in such a manner that a channel on which a symbols on one antenna port is conveyed can be inferred from a channel on which another symbol on the same antenna port is conveyed. In a case that a large scale property of the channel on which the symbol on one antenna port is conveyed can be inferred from the channel on which the symbol on another antenna port is conveyed, the two antenna ports are said to be Quasi Co-Located (QCL). The large scale property may include at least a long term performance of a channel. The large scale properties may include at least some or all of delay spread, Doppler spread, Doppler shift, average gain, average delay, and spatial Rx parameters. A first antenna port and a second antenna port being QCL with respect to a beam parameter may mean that a reception beam assumed by the reception side for the first antenna port may be the same as a reception beam assumed by the reception side for the second antenna port. The first antenna port and the second antenna port being QCL with respect to a beam parameter may mean that a transmission beam assumed by the reception side for the first antenna port may be the same as a transmission beam assumed by the reception side for the second antenna port. In a case that a large scale property of a channel on which a symbol on one antenna port is conveyed can be inferred from a channel on which a symbol on another antenna port is conveyed, the terminal apparatus 1 may assume the two antenna ports to be QCL. Two antenna ports being QCL may mean that the two antenna ports are assumed to be QCL.

For each of configuration of the subcarrier spacing and setting of carriers, a resource grid including $N^{\mu}_{RB,x}N^{RB}_{sc}$ subcarriers and $N^{(\mu)}_{symb}N^{subframe,\mu}_{symb}$ OFDM symbols is given. $N^{\mu}_{RB,x}$ may indicate the number of resource blocks given for the subcarrier spacing configuration μ for a carrier x. $N^{\mu}_{RB,x}$ may indicate the maximum number of resource blocks given for the subcarrier spacing configuration μ for the carrier x. The carrier x indicates either a downlink carrier or an uplink carrier. In other words, x is "DL" or "UL". $N^{\mu}_{RB}$ is a designation including $N^{\mu}_{RB,DL}$ and/or $N^{\mu}_{RB,UL}$. $N^{RB}_{sc}$ may indicate the number of subcarriers included in one resource block. At least one resource grid may be given for each antenna port p and/or for each subcarrier spacing configuration μ and/or for each Transmission direction configuration. The transmission direction includes at least Downlink (DL) and Uplink (UL). Hereinafter, a set of parameters including at least some or all of the antenna port p, the subcarrier spacing configuration μ, and the transmission direction configuration is also referred to as a first radio parameter set. That is, one resource grid may be given for each first radio parameter set.

A carrier included in a serving cell in downlink is referred to as a downlink carrier (or a downlink component carrier). A carrier included in a serving cell in uplink is referred to as an uplink carrier (uplink component carrier). A downlink component carrier and an uplink component carrier are collectively referred to as a component carrier.

Each element in the resource grid given for each first radio parameter set is referred to as a resource element. The resource element is identified by an index $k_{sc}$ of the frequency domain and an index l of the time domain. The resource element is identified by the index $k_{sc}$ of the frequency domain and the index l of the time domain for a first radio parameter set. The resource element identified by the index $k_{sc}$ of the frequency domain and the index l of the time domain is also referred to as a resource element ($k_{sc}$, l). The index $k_{sc}$ of the frequency domain indicates any value from 0 to $N^{\mu}_{RB}N^{RB}_{sc}-1$. $N^{\mu}_{RB}$ may be the number of resource blocks given for the subcarrier spacing configuration μ. $N^{RB}_{sc}$ is the number of subcarriers included in a resource block, and $N^{RB}_{sc}=12$. The index $k_{sc}$ of the frequency domain may correspond to a subcarrier index $k_{sc}$. The index l of the time domain may correspond to an OFDM symbol index l.

Figure 3:
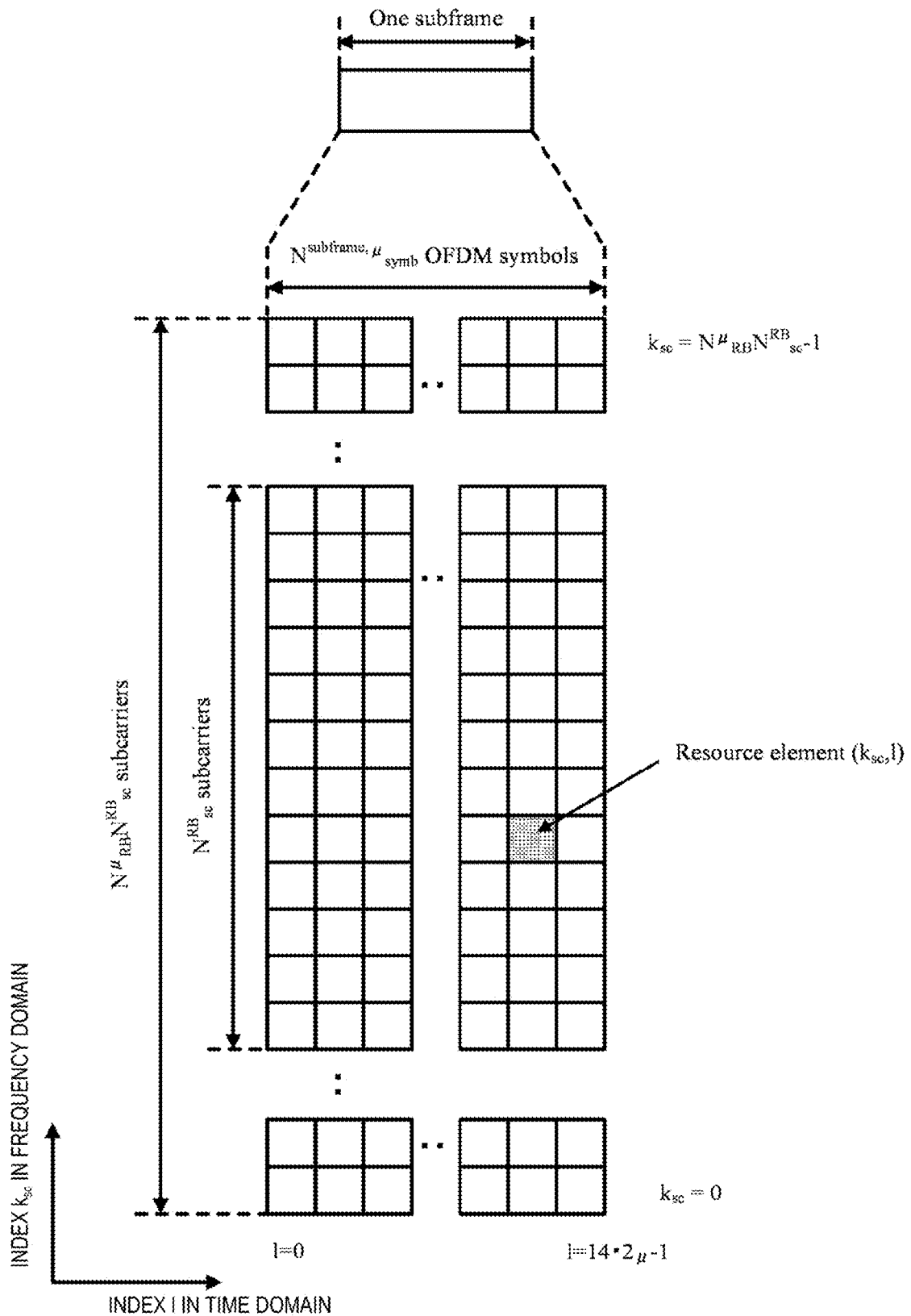
FIG. 3 is a schematic diagram illustrating an example of a resource grid in a subframe according to an aspect of the present embodiment.

FIG. 3 is a schematic diagram illustrating an example of a resource grid in a subframe according to an aspect of the present embodiment. In the resource grid of FIG. 3, the horizontal axis is the index l of the time domain, and the vertical axis is the index $k_{sc}$ of the frequency domain. In one subframe, the frequency domain of the resource grid includes $N^{\mu}_{RB}N^{RB}_{sc}$ subcarriers. In one subframe, the time domain of the resource grid may include 14*2μ OFDM symbols. A resource block includes $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may receive indication to perform transmission and/or reception by using only a subset of the resource grid. The subset of the resource grid is also referred to as a carrier bandwidth part, and the carrier bandwidth part may be given at least based on some or all of a higher layer parameter and/or DCI. The carrier bandwidth part is also referred to as a bandwidth part (BP). In other words, the terminal apparatus 1 need not receive indication to perform transmission and/or reception by using all sets of resource grids. In other words, the terminal apparatus 1 may receive indication to perform transmission and/or reception by using some of the frequency resources within the resource grid. One carrier bandwidth part may include multiple resource blocks in the frequency domain. One carrier bandwidth part may include multiple consecutive resource blocks in the frequency domain. A carrier bandwidth part is also referred to as a BandWidth Part (BWP). A carrier bandwidth part configured for a downlink carrier is also referred to as a downlink carrier bandwidth part. A carrier bandwidth part configured for an uplink carrier is also referred to as an uplink carrier bandwidth part.

A set of downlink carrier bandwidth parts may be configured for each serving cell. The set of downlink carrier bandwidth parts may include one or multiple downlink carrier bandwidth parts. A set of uplink carrier bandwidth parts may be configured for each serving cell. The set of uplink carrier bandwidth parts may include one or multiple uplink carrier bandwidth parts.

A higher layer parameter is a parameter included in higher layer signaling. The higher layer signaling may be a Radio Resource Control (RRC) signaling or a Medium Access Control Control Element (MAC CE). Here, the higher layer signaling may be RRC layer signaling or MAC layer signaling.

The higher layer signaling may be common RRC signaling. The common RRC signaling may include at least some or all of the following features C1 to C3.

Feature C1) mapped to a BCCH logical channel or to a CCCH real channel

Feature C2) including at least a radioResourceConfigCommon information element

Feature C3) mapped to a PBCH

The radioResourceConfigCommon information element may include information indicating a configuration commonly used in a serving cell. The configuration commonly used in the serving cell may include at least a PRACH configuration. The PRACH configuration may indicate at least one or multiple random access preamble indices. The PRACH configuration may indicate at least a time/frequency resource of a PRACH.

The higher layer signaling may be dedicated RRC signaling. The dedicated RRC signaling may include at least some or all of the following features D1) and D2.

Feature D1) mapped to a DCCH logical channel

Feature D2) including at least a radioResourceConfigDedicated information element The radioResourceConfigDedicated information element may include at least information indicating a configuration specific to the terminal apparatus 1. The radioResourceConfigDedicated information element may include at least information indicating a configuration of the carrier bandwidth part. The configuration of the carrier bandwidth part may indicate at least a frequency resource of the carrier bandwidth part.

For example, MIB, first system information, and second system information may be included in the common RRC signaling. In addition, a higher layer message that is mapped to a DCCH logical channel and includes at least radioResourceConfigCommon may be included in the common RRC signaling. In addition, a higher layer message that is mapped to the DCCH logical channel and does not include the radioResourceConfigCommon information element may be included in the dedicated RRC signaling. In addition, a higher layer message that is mapped to the DCCH logical channel and includes at least the radioResourceConfigDedicated information element may be included in the dedicated RRC signaling.

The first system information may include at least a time index of a Synchronization Signal (SS) block. The SS block is also referred to as an SS/PBCH block. The first system information may include at least information of a PRACH resource. The first system information may include at least information on a configuration of initial connection. The second system information may be system information other than the first system information.

The radioResourceConfigDedicated information element may include at least information of the PRACH resource. The radioResourceConfigDedicated information element may include at least information on the configuration of initial connection.

A physical channel and a physical signal according to various aspects of the present embodiment will be described below.

An uplink physical channel may correspond to a set of resource elements that conveys information generated in a higher layer. The uplink physical channel is a physical channel used in an uplink carrier. In the radio communication system according to an aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used to transmit uplink control information (UCI). The uplink control information includes some or all of Channel State Information (CSI), a Scheduling Request (SR), and a Hybrid Automatic Repeat request ACKnowledgement (HARQ-ACK) corresponding to a Transport block (TB), a Medium Access Control Protocol Data Unit (MAC PDU), a DownLink-Shared Channel (DL-SCH), or a Physical Downlink Shared Channel (PDSCH).

The HARQ-ACK may include at least an HARQ-ACK bit corresponding to at least one transport block. The HARQ-ACK bit may indicate an acknowledgement (ACK) or a negative-acknowledgement (NACK) corresponding to one or multiple transport blocks. The HARQ-ACK may include at least an HARQ-ACK code book including one or multiple HARQ-ACK bits. The HARQ-ACK bit corresponding to one or multiple transport blocks may mean the HARQ-ACK bit corresponding to a PDSCH including the one or multiple transport blocks.

The HARQ-ACK bit may indicate an ACK or a NACK corresponding to each of one Code Block Group (CBG) included in the transport block. The HARQ-ACK is also referred to as HARQ feedback, HARQ information, or HARQ control information.

In a case that the PDSCH is scheduled in accordance with the DCI format including the PDSCH-to-HARQ-timing-indicator field, and a slot #n-$k_n$ includes a last OFDM symbol to which the PDSCH is mapped, a PUCCH including the HARQ-ACK bit corresponding to each of one or multiple transport blocks included in the PDSCH may be transmitted in a slot #n. $k_n$ may be given at least based on the PDSCH-to-HARQ-timing-indicator field. The $k_n$ is also referred to as a first PDSCH processing time. The first PDSCH processing time may correspond to the DCI format. The first PDSCH processing time corresponding to the DCI format may mean the first PDSCH processing time being given at least based on the PDSCH-to-HARQ-timing-indicator field included in the DCI format.

In a case that the PDSCH is scheduled in accordance with the DCI format not including the PDSCH-to-HARQ-timing-indicator field and that the slot #n-$k_a$ includes the last OFDM symbol to which the PDSCH is mapped, the PUCCH including the HARQ-ACK bit corresponding to each of one or multiple transport blocks included in the PDSCH may be transmitted in the slot n. The $k_a$ may be given independently of the PDSCH-to-HARQ-timing-indicator field. The $k_a$ is also referred to as a second PDSCH processing time. The second PDSCH processing time may correspond to the DCI format.

The first PDSCH processing time and the second PDSCH processing time are also referred to as PDSCH processing time.

A set of the first PDSCH processing times corresponding to the DCI format may include the first PDSCH processing times corresponding to the values indicated by the PDSCH-to-HARQ-timing-indicator field included in the DCI format.

In a case that the DCI format including the PDSCH-to-HARQ-timing-indicator field indicates the SPS release and that the last OFDM symbol to which the PDCCH is mapped is included in the slot #n-$k_n$, the PUCCH including the HARQ-ACK bit corresponding to the SPS release may be transmitted in the slot #n. The $k_n$ may be given at least based on the PDSCH-to-HARQ-timing-indicator field. The first PDSCH processing time may correspond to the DCI format.

The SPS release may be used at least to release a Configured grant in a higher layer. The DCI format indicating the SPS release need not be used for scheduling of the PDSCH. The SPS release may be indicated by a prescribed field included in the DCI format being set to a prescribed value. The prescribed field may include at least a PDSCH-to-HARQ-timing-indicator field. The prescribed field may include at least a Time-domain PDSCH resource field. The prescribed field may include at least an NDI indication information field. The prescribed field may include at least an RV information field.

The scheduling request may be at least used to request PUSCH resources for initial transmission.

The channel state information may include at least some or all of a Channel Quality Indicator (CQI), a Precoder Matrix Indicator (PMI), and a Rank Indicator (RI). The CQI is an indicator associated with channel quality (e.g., a propagation strength), and the PMI is an indicator indicating a precoder. The RI is an indicator indicating a transmission rank (or the number of transmission layers).

The PUSCH is used at least to transmit transport blocks (TB, MAC PDU, UL-SCH, and PUSCH). The PUSCH may be used to transmit at least some or all of the transport blocks, HARQ-ACK, channel state information, and scheduling request. The PUSCH is used to at least transmit random access message 3.

The PRACH is used at least to transmit a random access preamble (random access message 1). The PRACH may be used at least to indicate some or all of an initial connection establishment procedure, a handover procedure, a connection re-establishment procedure, synchronization with PUSCH transmission (timing adjustment), and a resource request for the PUSCH. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

In FIG. 1, the following uplink physical signals are used for uplink radio communication. The uplink physical signals may not be used to transmit information output from a higher layer, but is used by a physical layer.

UpLink Demodulation Reference Signal (UL DMRS)
Sounding Reference Signal (SRS)
UpLink Phase Tracking Reference Signal (UL PTRS)

The UL DMRS is associated with transmission of a PUSCH and/or a PUCCH. The UL DMRS is multiplexed with the PUSCH or the PUCCH. The base station apparatus 3 may use the UL DMRS in order to perform channel compensation of the PUSCH or the PUCCH. Transmission of both a PUSCH and a UL DMRS associated with the PUSCH will be hereinafter referred to simply as transmission of a PUSCH. Transmission of both a PUCCH and a UL DMRS associated with the PUCCH will be hereinafter referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The SRS may not be associated with transmission of the PUSCH or the PUCCH. The base station apparatus 3 may use the SRS for measuring a channel state. The SRS may be transmitted at the end of a subframe in an uplink slot or in a predetermined number of OFDM symbols from the end.

The UL PTRS may be a reference signal that is at least used for phase tracking. The UL PTRS may be associated with a UL DMRS group including at least an antenna port used for one or multiple UL DMRSs. The association of the UL PTRS with UL DMRS group may mean that the antenna port for the UL PTRS and some or all of the antenna ports included in the UL DMRS group are at least QCL. The UL DMRS group may be identified at least based on the antenna port of the lowest index for the UL DMRS included in the UL DMRS group. The UL PTRS may be mapped to an antenna port having the lowest index and included in one or multiple antenna ports to which one codeword is mapped. In a case that one codeword is at least mapped to the first layer and the second layer, the UL PTRS may be mapped to the first layer. The UL PTRS need not be mapped to the second layer. The index of the antenna port to which the UL PTRS is mapped may be given at least based on the downlink control information.

In FIG. 1, the following downlink physical channels are used for downlink radio communication from the base station apparatus 3 to the terminal apparatus 1. The downlink physical channels are used by the physical layer for transmission of information output from a higher layer.

Physical Broadcast Channel (PBCH)
Physical Downlink Control Channel (PDCCH)
Physical Downlink Shared Channel (PDSCH)

The PBCH is used at least to transmit a Master Information Block (MIB, BCH, or Broadcast Channel). The PBCH may be transmitted at a prescribed transmission interval. The PBCH may be transmitted at intervals of 80 ms. The PBCH may be transmitted at intervals of 160 ms. Contents of information included in the PBCH may be updated at intervals of 80 ms. Some or all of the information included in the PBCH may be updated at intervals of 160 ms. The PBCH may include 288 subcarriers. The PBCH may include 2, 3, or 4 OFDM symbols. The MIB may include information on an identifier (index) of a synchronization signal. The MIB may include information indicating at least some of numbers of slots, subframes, and/or radio frames in which the PBCH is transmitted.

The PDCCH is used at least to transmit Downlink Control Information (DCI). The PDCCH may be transmitted with at least the downlink control information. The downlink control information is also called a DCI format. The downlink control information may include at least either a downlink grant or an uplink grant. The DCI format used for scheduling of the PDSCH may also be referred to as a downlink grant. The DCI format used for scheduling of the PUSCH may also be referred to as an uplink grant. The downlink grant is also referred to as downlink assignment or downlink allocation.

The DCI format may include at least some or all of a Transport Block Size (TBS) information field mapped to information bits at least indicating the TBS of a transport block included in a PDSCH scheduled in accordance with the DCI format, a Resource allocation field mapped to information bits at least indicating a set of resource blocks to which the PDSCH is mapped in the frequency domain, an MCS information field mapped to information bits at least indicating a modulation scheme for the PDSCH, an HARQ process number information field mapped to information bits at least indicating an HARQ process number corresponding to the transport block, a New Data Indicator (NDI) indication information field mapped to information bits at least indicating an NDI corresponding to the transport block; and a Redundancy Version (RV) information field mapped to information bits at least indicating an RV for the transport block.

The one or multiple information fields included in the DCI format may be mapped to information bits given through joint coding of multiple pieces of indication information. For example, the DCI format may include the MCS information field mapped to information bits given at least based on joint coding of information of the TBS and information indicating a modulation scheme for the PDSCH.

In various aspects of the present embodiment, unless otherwise specified, the number of resource blocks indicates the number of resource blocks in the frequency domain.

A single downlink grant is at least used for scheduling of a single PDSCH in a single serving cell.

A single uplink grant is at least used for scheduling of a single PUSCH in a single serving cell.

A single physical channel may be mapped to a single serving cell. A single physical channel may be mapped to a single carrier bandwidth part configured for a single carrier included in a single serving cell.

For the terminal apparatus 1, one or multiple COntrol REsource SETs (CORESETs) are configured. The terminal apparatus 1 monitors the PDCCH in one or multiple control resource sets.

The control resource set may indicate a time-frequency domain to which one or multiple PDCCHs can be mapped. The control resource set may be a region in which the terminal apparatus 1 monitors the PDCCH. The control resource set may include continuous resources (Localized resources). The control resource set may include non-continuous resources (distributed resources).

In the frequency domain, the unit of mapping the control resource set may use a resource block. In the frequency domain, for example, the unit of mapping the control resource set may be six resource blocks. In the time domain, the unit of mapping the control resource set may use an OFDM symbol. In the time domain, for example, the unit of mapping the control resource set may be one OFDM symbol.

The frequency domain of the control resource sets may be given at least based on higher layer signaling and/or downlink control information.

The time domain of the control resource sets may be given at least based on higher layer signaling and/or downlink control information.

A certain control resource set may be a Common control resource set. The common control resource set may be a control resource set configured commonly to multiple terminal apparatuses 1. The common control resource set may be given at least based on some or all of an MIB, first system information, second system information, common RRC signaling, and a cell ID. For example, the time resource and/or the frequency resource of the control resource set configured to monitor the PDCCH to be used for scheduling of the first system information may be given at least based on the MIB.

A certain control resource set may be a Dedicated control resource set. The dedicated control resource set may be a control resource set configured to be used exclusively for the terminal apparatus 1. The dedicated control resource set may be given at least based on dedicated RRC signaling and some or all of values of C-RNTI.

A set of candidates for the PDCCH monitored by the terminal apparatus 1 may be defined from the perspective of the search space. In other words, the set of PDCCH candidates monitored by the terminal apparatus 1 may be provided by the search space.

The search space may include one or multiple PDCCH candidates at one or multiple Aggregation levels. The aggregation level of the PDCCH candidate may indicate the number of CCEs constituting the PDCCH.

The terminal apparatus 1 may monitor at least one or multiple search space in a slot in which Discontinulous reception (DRX) is not configured. The DRX may be given at least based on a higher layer parameter. The terminal apparatus 1 may monitor at least one or multiple Search space sets in a slot in which the DRX is not configured.

The search space set may include at least one or multiple search spaces. The search space set may include at least some or all of Type 0 PDCCH common search spaces, Type 1 PDCCH common search spaces, and/or the UE-specific search spaces.

Each of the search space sets may be associated with a single control resource set. Each of the search space sets may be included in a single control resource set. Each search space set may be given an index of the control resource set associated with the search space set.

For each search space set, at least the DCI format included in the monitored PDCCH may be configured. For a certain Type 0 common search space, at least monitoring of the PDCCH including the first DCI format may be configured. For a certain Type 1 PDCCH common search space, at least monitoring of the PDCCH including the first DCI format may be configured. For a certain UE-specific search space, at least monitoring of the first DCI format and/or the second DCI format may be configured. The first DCI format and the second DCI format are also referred to as a DCI format.

The first DCI format need not include at least a field indicating an index of a carrier bandwidth part in which the PDSCH scheduled with the first DCI format is transmitted. The second DCI format may include at least a field indicating an index of a carrier bandwidth part to which the PDSCH scheduled by the second DCI format is transmitted.

The first DCI format may be a DCI format not including two transport blocks in the PDSCH scheduled with the first DCI format, independently of the value of a higher layer parameter Number-MCS-HARQ-DL-DCI. The first DCI format may include an MCS field corresponding to the first transport block independently of the value of the higher layer parameter Number-MCS-HARQ-DL-DCI. The first DCI format need not include an MCS field corresponding to the second transport block independently of the value of the higher layer parameter Number-MCS-HARQ-DL-DCI.

The second DCI format may be a DCI format in which whether two transport blocks are included in the PDSCH scheduled with the second DCI format or not is given at least based on the value of the higher layer parameter Number-MCS-HARQ-DL-DCI. At least based on the value of the higher layer parameter Number-MCS-HARQ-DL-DCI, the first DCI format may include an MCS field corresponding to the first transport block and an MCS field corresponding to the second transport block.

For each of the search space sets, Monitoring periodicity of the search space set may be configured. The monitoring periodicity of the search space set may indicate at least the interval between the slots in which the search space set is monitored by the terminal apparatus 1. A higher layer parameter indicating at least the monitoring periodicity of the search space set may be provided for each search space set.

For each of the search space sets, a Monitoring offset of the search space set may be configured. The monitoring offset of the search space set may indicate at least an offset from a reference index (e.g., slot #0) of the index of the slot in which the search space set is monitored by the terminal apparatus 1. A higher layer parameter indicating at least the monitoring offset of the search space set may be provided for each search space set.

For each of the search space sets, a Monitoring pattern of the search space set may be configured. The monitoring pattern of the search space set may indicate the first OFDM symbol for the search space set in which the monitoring is performed. The monitoring pattern of the search space set may be provided by a bitmap indicating the first OFDM symbol in one or multiple slots. A higher layer parameter indicating at least the monitoring pattern of the search space set may be provided for each search space set.

A Monitoring occasion for the search space set may be given at least based on some or all of the monitoring periodicity of the search space set, the monitoring offset of the search space set, the monitoring pattern of the search space set, and/or the DRX configuration.

Figure 4:
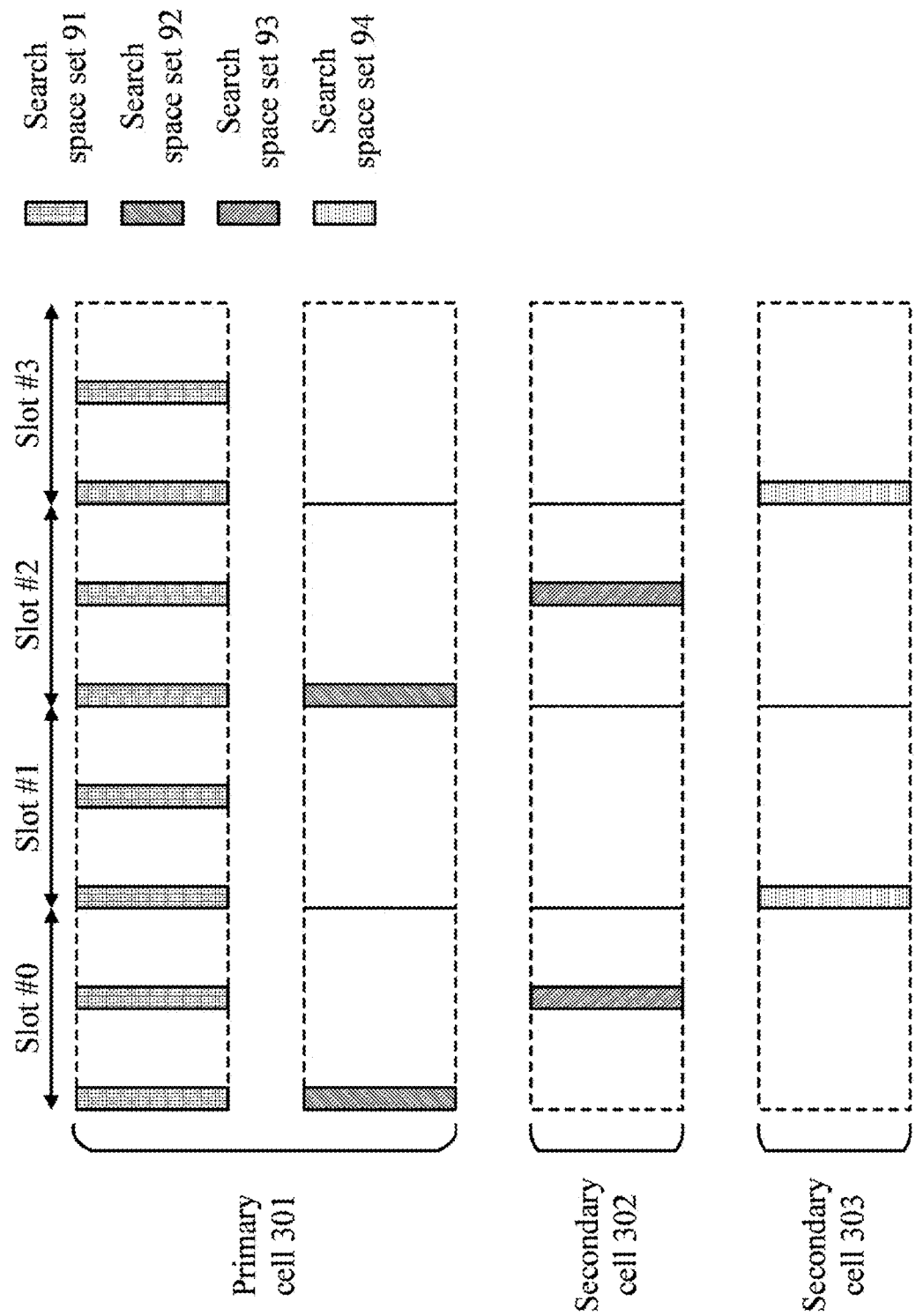
FIG. 4 is a diagram illustrating an example of search space set monitoring occasions and PDCCH monitoring occasions according to one aspect of the present embodiment.

FIG. 4 is a diagram illustrating an example of monitoring occasions for the search space set and PDCCH monitoring occasions according to one aspect of the present embodiment. In FIG. 4, search space sets 91 and search space sets 92 are configured in a primary cell 301, search space sets 93 are configured in a secondary cell 302, and a search space set 94 is configured in a secondary cell 303.

In FIG. 4, blocks indicated by a grid line indicate the search space sets 91, blocks indicated by an upward-sloping line indicate the search space sets 92, blocks indicated by a downward-sloping line indicate the search space sets 93, and blocks indicated by a horizontal line indicate the search space sets 94.

The monitoring periodicity of the search space set 91 is set to one slot, the monitoring offset of the search space set 91 is set to zero slots, and the monitoring pattern of the search space set 91 is set to [1,0,0,0,0,0,0,1,0,0,0,0,0,0]. In other words, the monitoring occasion for the search space set 91 corresponds to the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1,0,0,0,0,0,0,0,0,0,0,0,0,0]. In other words, the monitoring occasion for the search space set 92 corresponds to the first OFDM symbol (OFDM symbol #0) in each even-numbered slot.

The monitoring periodicity of the search space set 93 is set to two slots, the monitoring offset of the search space set 93 is set to zero slots, and the monitoring pattern of the search space set 93 is set to [0,0,0,0,0,0,0,1,0,0,0,0,0,0]. In other words, the monitoring occasion for the search space set 93 is the eighth OFDM symbol (OFDM symbol #7) in each even-numbered slot.

The monitoring periodicity of the search space set 94 is set to two slots, the monitoring offset of the search space set 94 is set to one slot, and the monitoring pattern of the search space set 94 is set to [1,0,0,0,0,0,0,0,0,0,0,0,0,0]. In other words, the monitoring occasion for the search space set 94 is the first OFDM symbol (OFDM symbol #0) in each odd-numbered slot.

From slot #0 to slot #3 in FIG. 4, the number of occasions (PDCCH monitoring occasions) on which the PDCCH is monitored is eight. The number of PDCCH monitoring occasions may be given by the sum and/or union of the monitoring occasions for the search space set configured in the serving cell configured for the terminal apparatus 1.

For example, in a case that the search space sets 91 and the search space sets 92 are configured in the primary cell 301, the PDCCH monitoring occasions from slot #0 to slot #3 in FIG. 4 include the OFDM symbol #0 in the slot #0, the OFDM symbol #7 in the slot #0, the OFDM symbol #0 in the slot #1, the OFDM symbol #7 in the slot #1, the OFDM symbol #0 in the slot #2, the OFDM symbol #7 in the slot #2, the OFDM symbol #0 in the slot #3, and OFDM symbol #7 in the slot #3. In other words, in a case that the search space sets 91 and the search space sets 92 are configured in the primary cell 301, the number of PDCCH monitoring occasions from slot #0 to slot #3 in FIG. 4 is eight.

For example, in a case that the search space sets 92 are configured in the primary cell 301 and the search space sets 93 are configured in the secondary cell 302, the PDCCH monitoring occasions from slot #0 to slot #3 in FIG. 4 include the OFDM symbol #0 in the slot #0, the OFDM symbol #7 in the slot #0, the OFDM symbol #0 in the slot #2, and the OFDM symbol #7 in the slot #2. In other words, in a case that the search space set 92 is configured in the primary cell 301 and the search space set 93 is configured in the secondary cell 302, the number of PDCCH monitoring occasions from slot #0 to slot #3 in FIG. 4 is four.

Type 0 PDCCH common search space may be used at least for the DCI format with a CRC sequence scrambled with a System Information-Radio Network Temporary Identifier (SI-RNTI). The configuration of the control resource set at least associated with Type 0 PDCCH common search space may be given at least based on a higher layer parameter RMSI-PDCCH-Config. The higher layer parameter RMSI-PDCCH-Config may be included in the MIB. The higher layer parameter RMSI-PDCCH-Config may indicate at least one or both of the number of resource blocks included in the control resource set at least associated with Type 0 PDCCH common search space, and the number of OFDM symbols included in the control resource set. The higher layer parameter RMSI-PDCCH-Config may be indicated by an information field included in the MIB.

Type 1 PDCCH common search space may be used at least for the DCI format with a CRC sequence scrambled with a Random Access-Radio Network Temporary Identifier (RA-RNTI), a CRC sequence scrambled with a Temporary Common-Radio Network Temporary Identifier (TC-RNTI), and/or a CRC sequence scrambled with a Common-Radio Network Temporary Identifier (C-RNTI). The RA-RNTI may be given at least based on a time/frequency resource of the random access preamble transmitted by the terminal apparatus 1. The TC-RNTI may be provided by a PDSCH (also referred to as message 2 or a random access response grant) scheduled in accordance with the DCI format with the CRC sequence scrambled with the RA-RNTI. The C-RNTI may be given at least based on the PDSCH (also referred to as message 4 or a contention resolution) scheduled in accordance with the DCI format with the CRC sequence scrambled with the TC-RNTI.

The UE-specific search space may be used at least for the DCI format with the CRC sequence scrambled with the C-RNTI.

The common control resource set may include at least one or both of the CSS and the USS. The dedicated control resource set may include at least one or both of the CSS and the USS.

A physical resource of the search space includes a Control Channel Element (CCE) of the control channel. The CCE includes a predetermined number of Resource Element Groups (REGs). For example, the CCE may include six REGs. The REG may include one OFDM symbol in one Physical Resource Block (PRB). In other words, the REG may include 12 Resource Elements (REs). The PRB is also simply referred to as a Resource Block (RB).

The PDSCH is used at least to transmit the transport block. The PDSCH may be used at least to transmit random access message 2 (random access response). The PDSCH may be used at least to transmit system information including parameters used for initial access.

In a case that the PDSCH is scheduled in accordance with the DCI format including the Time-domain PDSCH resource field and the PDCCH including the DCI format is transmitted in the slot #n-$j_n$, the PDSCH may be transmitted in the slot #n. The $j_n$ may be given at least based on the Time-domain PDSCH resource field. The $j_n$ is also referred to as a first PDCCH processing time. The first PDCCH processing time may correspond to the DCI format. The first PDCCH processing time corresponding to the DCI format may mean the first PDCCH processing time being given at least based on the Time-domain PDSCH resource field included in the DCI format.

The set of the first PDCCH processing times corresponding to the DCI format may include at least the first PDCCH processing times corresponding to the values indicated by the Time-domain PDSCH resource field included in the DCI format.

In a case that the PDSCH is scheduled in accordance with the DCI format not including the Time-domain PDSCH resource field and the PDCCH including the DCI format is transmitted in the slot #n-$j_a$, the PDSCH may be transmitted in the slot #n. The $j_a$ may be given independently of the Time-domain PDSCH resource field. The $j_a$ is also referred to as a second PDCCH processing time. The second PDCCH processing time may correspond to the DCI format.

The first PDCCH processing time and the second PDCCH processing time are also referred to as the PDCCH processing time.

The PDSCH corresponding to the PDCCH may mean the PDSCH being scheduled in accordance with the DCI format included in the PDCCH.

In a case that the DCI format including the Time-domain PDSCH resource field indicates the SPS release and that the PDCCH including the DCI format is transmitted in a slot #n-$j_n$, the first PDCCH-PUCCH processing time may be given at least based on some or all of the PDSCH scheduled in accordance with the DCI format being assumed to be transmitted in the slot #n and/or the PDSCH-to-HARQ-timing-indicator field included in the DCI format. The $J_n$ may be given at least based on the Time-domain PDSCH resource field. The first PDCCH processing time may correspond to the DCI format. Details of a first PDCCH-PUCCH processing time will be described below.

In a case that the DCI format including the Time-domain PDSCH resource field indicates the SPS release and that the PDCCH including the DCI format is transmitted in a slot #n-$j_x$, the first PDCCH-PUCCH processing time may be given at least based on some or all of the PDSCH scheduled in accordance with the DCI format being assumed to be transmitted in the slot #n and/or the PDSCH-to-HARQ-timing-indicator field included in the DCI format. The $j_x$ is also referred to as an SPS release processing time. The $j_x$ may be given independently of the Time-domain PDSCH resource field. The $j_x$ may be given at least based on a higher layer parameter. The $j_x$ may be set to 0. The $j_x$ may be set to a prescribed value.

The set of the first PDCCH processing times corresponding to the DCI format may include at least the first PDCCH processing times corresponding to the values indicated by the Time-domain PDSCH resource field included in the DCI format.

In a case that the DCI format not including the Time-domain PDSCH resource field indicates the SPS release and the PDCCH including the DCI format is transmitted in slot #n-$j_a$, the second PDCCH-PUCCH processing time may be given at least based on some or all of the PDSCH being assumed to be transmitted in the slot #n and/or the PDSCH-to-HARQ-timing-indicator field included in the DCI format. The $j_a$ may be given independently of the Time-domain PDSCH resource field. The $j_a$ may be set to a prescribed value. The $j_a$ may be set to 0. The second PDCCH processing time may correspond to the DCI format.

The SPS release being indicated in accordance with the DCI format may mean the SPS release being indicated by the PDCCH including the DCI format. The SPS release being indicated may mean the SPS release being activated.

The PDCCH-PUCCH processing time indicating a time (or slot) from a slot in which the PDCCH is transmitted to a slot in which the PUCCH including the HARQ-ACK corresponding to the PDCCH is transmitted may be given at least based on some or all of the first PDCCH processing time, the second PDCCH processing time, the first PDSCH processing time, and/or the second PDSCH processing time. The PDCCH-PUCCH processing time may be defined by the number of slots. The length of the slot may be given at least based on the maximum value and/or the minimum value of the subcarrier spacing configurations µ configured in the respective serving cells configured for the terminal apparatus 1. The length of the slot may be given at least based on a subcarrier spacing configuration µ configured in the serving cell in which the PUCCH is transmitted. The length of the slot may be given at least based on the maximum value and/or the minimum value of the subcarrier spacing configurations µ configured in the respective carrier bandwidth parts configured in the respective serving cells configured for the terminal apparatus 1. The length of the slot may be given at least based on the subcarrier spacing configuration µ configured in the carrier bandwidth part in which the PUCCH is transmitted. The HARQ-ACK corresponding to the PDCCH may be an HARQ-ACK corresponding to each of the one or multiple transport blocks included in the PDSCH included in the PDSCH scheduled in accordance with the DCI format included in the PDCCH. The HARQ-ACK corresponding to the PDCCH may be an HARQ-ACK corresponding to the SPS release indicated in accordance with the DCI format included in the PDCCH.

The first PDCCH-PUCCH processing time in a case that the PDSCH is scheduled in accordance with the DCI format including the Time-domain PDSCH resource field and the PDSCH-to-HARQ-timing-indicator field may be given at least based on some or all of the first PDCCH processing time corresponding to the DCI format and/or the first PDSCH processing time corresponding to the DCI format. The set of the first PDCCH-PUCCH processing times corresponding to the DCI format may include the first PDCCH-PUCCH processing times given at least based on some or all of the first PDCCH processing times included in the set of the first PDCCH processing times corresponding to the DCI format and/or the first PDSCH processing times included in the set of the first PDSCH processing times corresponding to the DCI format.

The first PDCCH-PUCCH processing time in a case that the SPS release is indicated in accordance with the DCI format including the Time-domain PDSCH resource field and the PDSCH-to-HARQ-timing-indicator field may be given at least based on some or all of the first PDCCH processing time corresponding to the DCI format, the SPS release processing time, and/or the first PDSCH processing time corresponding to the DCI format. The set of the first PDCCH-PUCCH processing times corresponding to the DCI format may include the first PDCCH-PUCCH processing times given at least based on some or all of the first PDCCH processing times included in the set of the first PDCCH processing times corresponding to the DCI format, the SPS release processing time, and/or the first PDSCH processing times included in the set of the first PDSCH processing times corresponding to the DCI format.

The second PDCCH-PUCCH processing time in a case that the PDSCH is scheduled in accordance with the DCI format including the Time-domain PDSCH resource field and not including the PDSCH-to-HARQ-timing-indicator field may be given at least based on some or all of the first PDCCH processing time corresponding to the DCI format and/or the second PDSCH processing time corresponding to the DCI format. The set of the second PDCCH-PUCCH processing times corresponding to the DCI format may include the first PDCCH-PUCCH processing time given at least based on some or all of the first PDCCH processing times included in the set of the first PDCCH processing times corresponding to the DCI format and/or the second PDSCH processing time corresponding to the DCI format.

The second PDCCH-PUCCH processing time in a case that the SPS release is indicated in accordance with the DCI format including the Time-domain PDSCH resource field and not including the PDSCH-to-HARQ-timing-indicator field may be given at least based on some or all of the first PDCCH processing time corresponding to the DCI format, the SPS release processing time, and/or the second PDSCH processing time corresponding to the DCI format. The set of the second PDCCH-PUCCH processing times corresponding to the DCI format may include the first PDCCH-PUCCH processing times given at least based on some or all of the first PDCCH processing times included in the set of the first PDCCH processing times corresponding to the DCI format, the SPS release processing time, and/or the second PDSCH processing times corresponding to the DCI format.

The third PDCCH-PUCCH processing time in a case that the PDSCH is scheduled in accordance with the DCI format not including the Time-domain PDSCH resource field but including the PDSCH-to-HARQ-timing-indicator field may be given at least based on some or all of the second PDCCH processing time corresponding to the DCI format and/or the first PDSCH processing time corresponding to the DCI format. The set of the third PDCCH-PUCCH processing times corresponding to the DCI format may include the third PDCCH-PUCCH processing times given at least based on some or all of the second PDCCH processing times corresponding to the DCI format, and/or the first PDSCH processing times included in the set of the first PDSCH processing times corresponding to the DCI format.

The third PDCCH-PUCCH processing time in a case that the SPS release is indicated in accordance with the DCI format not including the Time-domain PDSCH resource field but including the PDSCH-to-HARQ-timing-indicator field may be given at least based on some or all of the second PDCCH processing time corresponding to the DCI format, and/or the first PDSCH processing time corresponding to the DCI format. The set of the third PDCCH-PUCCH processing times corresponding to the DCI format may include the third PDCCH-PUCCH processing times given at least based on some or all of the second PDCCH processing times corresponding to the DCI format, and/or the first PDSCH processing times included in the set of the first PDSCH processing times corresponding to the DCI format.

The fourth PDCCH-PUCCH processing time in a case that the PDSCH is scheduled in accordance with the DCI format not including the Time-domain PDSCH resource field and not including the PDSCH-to-HARQ-timing-indicator field may be given at least based on some or all of the second PDCCH processing time corresponding to the DCI format and/or the second PDSCH processing time corresponding to the DCI format. The set of the fourth PDCCH-PUCCH processing times corresponding to the DCI format may include the fourth PDCCH-PUCCH processing times given at least based on some or all of the second PDCCH processing time corresponding to the DCI format and/or the second PDSCH processing time corresponding to the DCI format.

The fourth PDCCH-PUCCH processing time in a case that the SPS release is indicated in accordance with the DCI format not including the Time-domain PDSCH resource field or the PDSCH-to-HARQ-timing-indicator field may be given at least based on some or all of the second PDCCH processing time corresponding to the DCI format and/or the second PDSCH processing time corresponding to the DCI format. The set of the fourth PDCCH-PUCCH processing times corresponding to the DCI format may include the fourth PDCCH-PUCCH processing times given at least based on some or all of the second PDCCH processing time corresponding to the DCI format and/or the second PDSCH processing time corresponding to the DCI format.

The first PDCCH-PUCCH processing time, the second PDCCH-PUCCH processing time, the third PDCCH-PUCCH processing time, and the fourth PDCCH-PUCCH processing time are also referred to as the PDCCH-PUCCH processing time.

The set of the first PDCCH-PUCCH processing times, the set of the second PDCCH-PUCCH processing times, the set of the third PDCCH-PUCCH processing times, and the set of the fourth PDCCH-PUCCH processing times are also referred to as a set of PDCCH-PUCCH processing times.

In FIG. 1, the following downlink physical signals are used for the downlink radio communication. The downlink physical signals may not be used for transmitting information output from a higher layer, but is used by the physical layer.

Synchronization signal (SS)
DownLink DeModulation Reference Signal (DL DMRS)
Channel State Information-Reference Signal (CSI-RS)
DownLink Phrase Tracking Reference Signal (DL PTRS)
Tracking Reference Signal (TRS)

The synchronization signal is used for the terminal apparatus 1 to establish synchronization in a frequency domain and/or a time domain in the downlink. The synchronization signal includes a Primary Synchronization Signal (PSS) and a Second Synchronization Signal (SSS).

An SS block (SS/PBCH block) is configured to include at least some or all of the PSS, the SSS, and the PBCH. Respective antenna ports of some or all of the PSS, SSS, and PBCH included in the SS block may be the same. Some or all of the PSS, SSS, and PBCH included in the SS block may be mapped to continuous OFDM symbols. Respective CP configurations of some or all of the PSS, SSS, and PBCH included in the SS block may be the same. Respective subcarrier spacing configurations $\mu$ of some or all of the PSS, SSS, and PBCH included in the SS block may be the same.

The DL DMRS is associated with transmission of the PBCH, PDCCH and/or PDSCH. The DL DMRS is multiplexed with the PBCH, PDCCH and/or PDSCH. The terminal apparatuses 1 may use the DL DMRS corresponding to the PBCH, PDCCH, or PDSCH in order to perform channel compensation of the PBCH, PDCCH or PDSCH. Hereinafter, transmission of both of the PBCH and the DL DMRS associated with the PBCH is simply referred to as transmission of the PBCH. Additionally, transmission of both of the PDCCH and the DL DMRS associated with the PDCCH is simply referred to as transmission of the PDCCH. In addition, transmission of both of the PDSCH and the DL DMRS associated with the PDSCH is simply referred to as transmission of the PDSCH. The DL DMRS associated with the PBCH is also referred to as a DL DMRS for the PBCH. The DL DMRS associated with the PDSCH is also referred to as a DL DMRS for the PDSCH. The DL DMRS associated with the PDCCH is also referred to as a DL DMRS associated with the PDCCH.

The DL DMRS may be a reference signal individually configured for the terminal apparatus 1. The sequence of the DL DMRS may be given at least based on a parameter individually configured for the terminal apparatus 1. The sequence of the DL DMRS may be given at least based on a UE specific value (e.g., C-RNTI, or the like). The DL DMRS may be individually transmitted for the PDCCH and/or the PDSCH.

The CSI-RS may be a signal at least used to calculate channel state information. A pattern of the CSI-RS assumed by the terminal apparatus may be given by at least a higher layer parameter.

The PTRS may be a signal to be at least used to compensate for phase noise. A pattern of the PTRS assumed by the terminal apparatus may be given at least based on a higher layer parameter and/or DCI.

The DL PTRS may be associated with a DL DMRS group that includes at least an antenna port used for one or multiple DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port of the lowest index of antenna ports for the DL DMRS included in the DL DMRS group.

The TRS may be a signal to be at least used for time and/or frequency synchronization. A pattern of the TRS assumed by the terminal apparatus may be given at least based on a higher layer parameter and/or DCI.

Downlink physical channels and downlink physical signals are collectively referred to as downlink signals. Uplink physical channels and uplink physical signals are collectively referred to as uplink signals. The downlink signals and the uplink physical signals are collectively referred to as physical signals. The downlink signal and the uplink signal are collectively referred to as signals. The downlink physical channels and the uplink physical channels are collectively referred to as physical channels. The downlink physical signals and the uplink physical signals are collectively referred to as physical signals.

The Broadcast CHannel (BCH), the Uplink-Shared CHannel (UL-SCH), and the Downlink-Shared CHannel (DL-SCH) are transport channels. A channel used in a Medium Access Control (MAC) layer is referred to as a transport channel. A unit of the transport channel used in the MAC layer is also referred to as a transport block (TB) or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 exchange (transmit and/or receive) higher layer signaling in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A serving cell-specific higher layer parameter may be transmitted by using the signaling common to the multiple terminal apparatuses 1 in the serving cell or the signaling dedicated to a certain terminal apparatus 1. A UE-specific higher layer parameter may be transmitted by using the signaling dedicated to the certain terminal apparatus 1.

A Broadcast Control CHannel (BCCH), a Common Control CHannel (CCCH), and a Dedicated Control CHannel (DCCH) are logical channels. For example, the BCCH is a higher layer channel used to transmit the MIB. Furthermore, the Common Control CHannel (CCCH) is a higher layer channel used to transmit information common to the multiple terminal apparatuses 1. Here, the CCCH may be used for a terminal apparatus 1 that is not in an RRC connected state, for example. Furthermore, the Dedicated Control CHannel (DCCH) is a higher layer channel at least used to transmit control information dedicated to the terminal apparatus 1 (dedicated control information). Here, the DCCH may be used for a terminal apparatus 1 that is in an RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

A configuration example of the terminal apparatus 1 according to the one aspect of the present embodiment will be described below.

Figure 5:
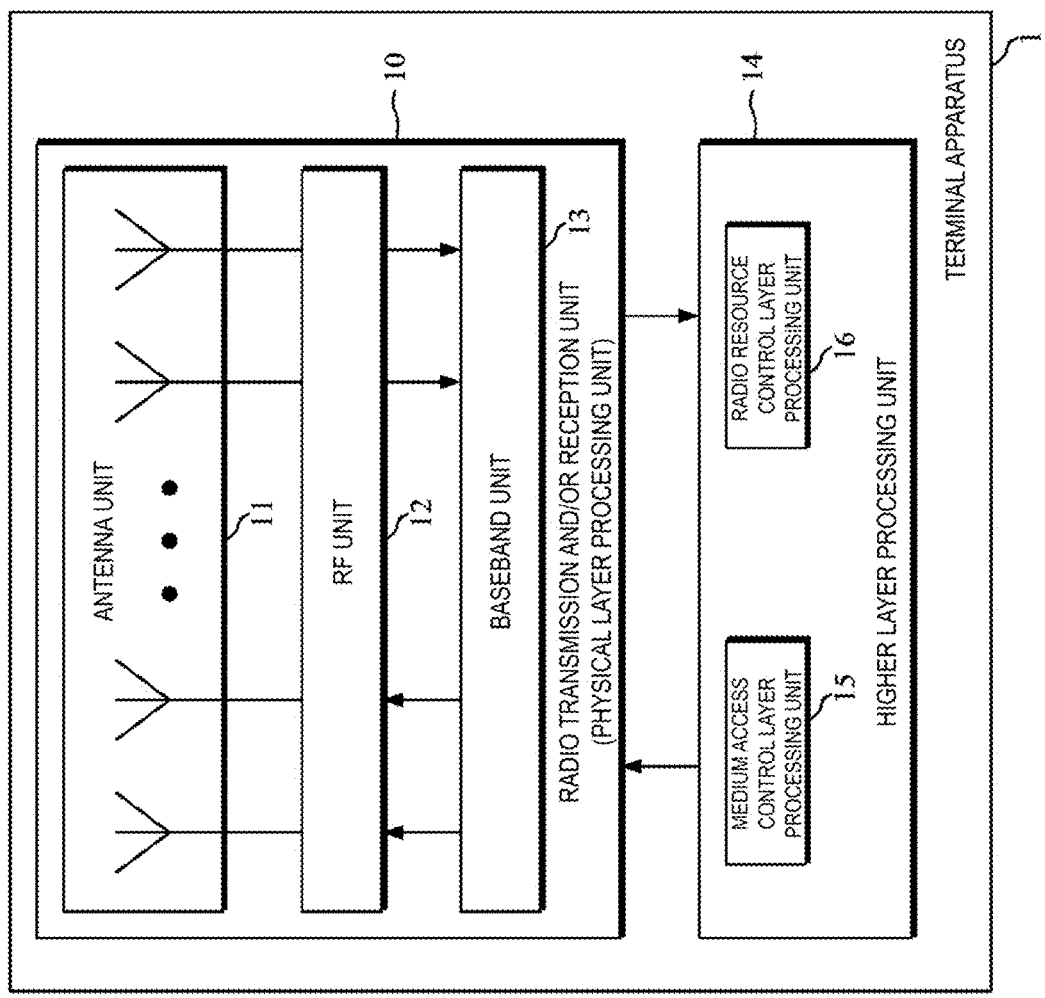
FIG. 5 is a schematic block diagram illustrating a configuration of a terminal apparatus 1 according to one aspect of the present embodiment.

FIG. 5 is a schematic block diagram illustrating a configuration of the terminal apparatus 1 according to one aspect of the present embodiment. As illustrated, the terminal apparatus 1 is configured to include a radio transmission and/or reception unit 10 and a higher layer processing unit 14. The radio transmission and/or reception unit 10 is configured to include at least some or all of an antenna unit 11, a Radio Frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The parameters may be higher layer parameters.

The radio transmission and/or reception unit 10 performs processing of the physical layer, such as modulation, demodulation, coding, decoding, and the like. The radio transmission and/or reception unit 10 demultiplexes, demodulates, and decodes a received physical signal and outputs the decoded information to the higher layer processing unit 14. The radio transmission and/or reception unit 10 generates a physical signal by performing modulation and coding of data, and generating a baseband signal (conversion into a time continuous signal), and transmits the physical signal to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to one aspect of the present embodiment will be described below.

Figure 6:
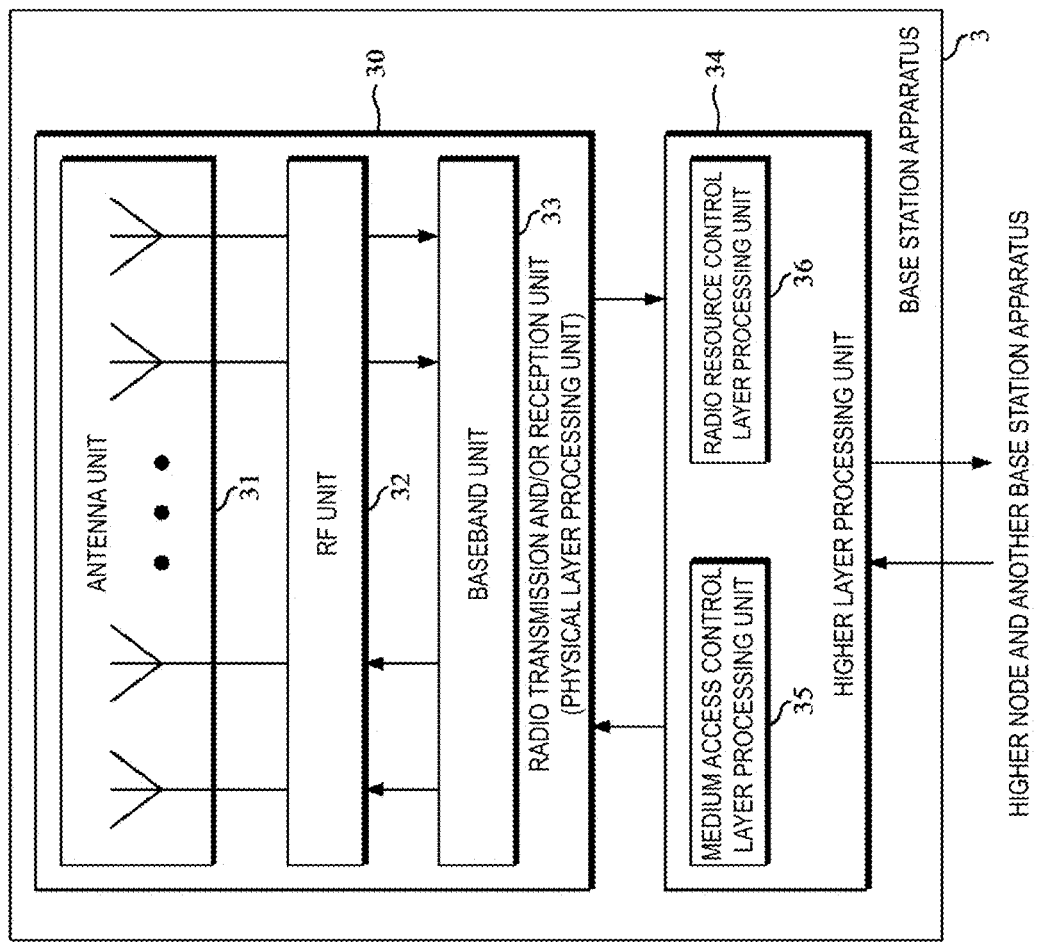
FIG. 6 is a schematic block diagram illustrating a configuration of a base station apparatus 3 according to one aspect of the present embodiment.

FIG. 6 is a schematic block diagram illustrating a configuration of the base station apparatus 3 according to one aspect of the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on a PDSCH, system information, an RRC message, a MAC CE, and the like, and outputs the data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspect examples according to one aspect of the present embodiment will be described below.

A serving cell group 100 may be a set of serving cells configured in the terminal apparatus 1. The serving cell group 100 may include one or multiple serving cells included in the Master Cell Group (MCG). The MCG may include at least a Primary cell. The primary cell may be a serving cell that is at least used for initial access. The subcarrier spacing configuration $\mu$ configured in the serving cell group 100 may be the same.

In a case that a Secondary Cell Group (SCG) is configured in the terminal apparatus 1 and one or multiple PDSCHs are received in one or multiple serving cells included in the SCG, the serving cell group 100 may include the one or multiple serving cells included in the SCG. At least the primary cell may be omitted from the configuration of the SCG. The SCG may include at least a Primary Secondary Cell (PSCell). PRACH resources may be configured for the primary secondary cell. PUCCH resources may be configured for the primary secondary cell.

In a case that a PUCCH-SCell is configured in the terminal apparatus 1 and one or multiple PDSCHs are received in one or multiple serving cells included in a PUCCH group including at least the PUCCH-SCell, the serving cell group 100 may include the one or multiple serving cells included in the PUCCH group. PUCCH resources may be configured for the PUCCH-SCell.

For transmission of HARQ-ACK bits corresponding to one or multiple transport blocks included in one or multiple PDSCHs transmitted in one or multiple downlink carriers included in the serving cell group 100, an HARQ-ACK code book including at least the HARQ-ACK bit may be generated. The HARQ-ACK code book may be transmitted on the PUCCH in the uplink carrier included in the serving cell group 100. The uplink carrier in which the PUCCH is transmitted may be included in the primary cell. In a case that the serving cell group 100 is an MCG, the uplink carrier in which the PUCCH is transmitted may be included in the primary cell included in the MCG. In a case that the serving cell group 100 is an SCG, the uplink carrier in which the PUCCH is transmitted may be included in the primary secondary cell included in the SCG. In a case that the serving cell group 100 is a PUCCH group, the uplink carrier in which the PUCCH is transmitted may be included in the PUCCH-SCell included in the PUCCH group.

Figure 7:
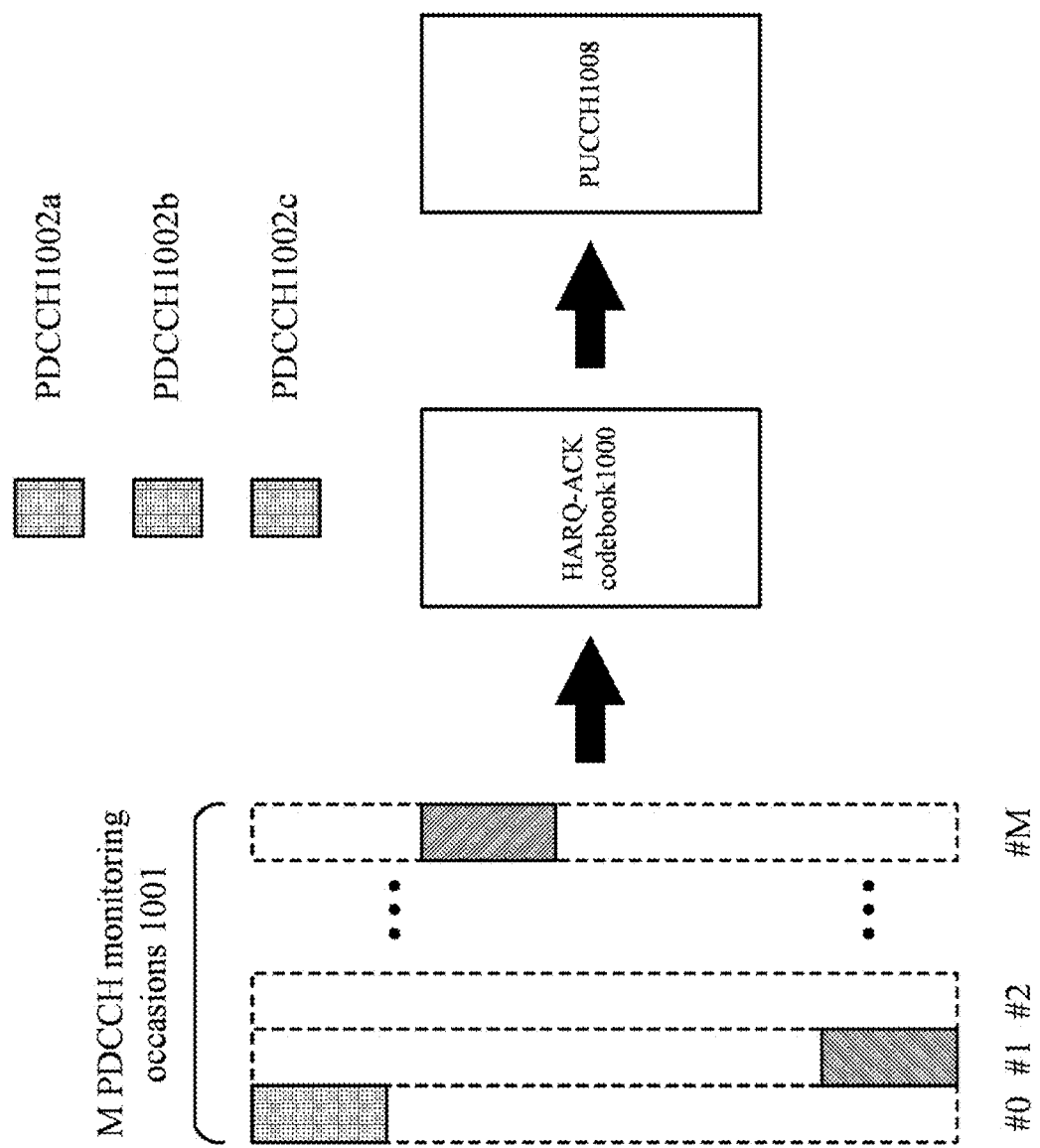
FIG. 7 is a diagram illustrating an example of a procedure for transmission of an HARQ-ACK code book 1000 according to one aspect of the present embodiment.

FIG. 7 is a diagram illustrating an example of a procedure for transmission of the HARQ-ACK code book 1000 according to one aspect of the present embodiment. In M PDCCH monitoring occasions 1001 associated with the HARQ-ACK code book 1000 in FIG. 7, a PDCCH 1002a, a PDCCH 1002b, and a PDCCH 1002c are transmitted. The PDCCH 1002a, the PDCCH 1002b, and the PDCCH 1002c are also referred to as the PDCCH 1002. The M PDCCH monitoring occasions 1001 associated with the HARQ-ACK code book 1000 will be described below.

The PDCCH 1002a includes a DCI format 1003a. The PDCCH 1002b includes a DCI format 1003b. The PDCCH 1002c includes a DCI format 1003c.

The DCI format 1003a schedules a PDSCH 1004a. The DCI format 1003b schedules a PDSCH 1004b. The DCI format 1003c indicates an SPS release 1005.

The DCI format 1003a, the DCI format 1003b, and the DCI format 1003 are also referred to as the DCI format 1003. The PDSCH 1004a and the PDSCH 1004b are also referred to as the PDSCH 1004.

The DCI format 1003 may include a DCI format detected in the M PDCCH monitoring occasions 1001 associated with the HARQ-ACK code book 1000.

The HARQ-ACK code book 1000 includes at least some or all of HARQ-ACK bits 1006 respectively corresponding to the one or multiple transport blocks included in the PDSCH 1004 and/or an HARQ-ACK bit 1007 corresponding to an SPS release 1005.

The HARQ-ACK code book 1000 is included in a PUCCH 1008, which is transmitted.

The s-th bit of the sequence of the HARQ-ACK code book 1000 is given by $o^{ACK}_a(s-1)$. The length of the sequence of the HARQ-ACK code book 1000 is $O^{ACK}$. In other words, s is an integer value ranging from 0 to $O^{ACK}-1$.

FIG. 8, FIG. 9, and FIG. 10 are diagrams illustrating an example of a configuration of the HARQ-ACK code book 1000 according to one aspect of the present embodiment. <AX> in FIG. 8, FIG. 9, and FIG. 10 is also referred to as step AX. In FIG. 8, FIG. 9, and FIG. 10, "A=B" may indicate that A is set to B.

In step A1, a serving cell index c is set to 0. The serving cell index may be given for each serving cell at least based on a higher layer parameter.

In step A2, m=0 is set. m may indicate the index of the PDCCH monitoring occasion including at least one or both of the first DCI format and/or the second DCI format. The index of the PDCCH monitoring occasion may be used to identify the monitoring occasion of the M PDCCH monitoring occasions 1001 associated with the HARQ-ACK code book 1000. In m, the lower index may correspond to the earlier of the PDCCH monitoring occasions including at least one or both of the first DCI format and/or the second DCI format. In m, the lower index may correspond to the earlier of the PDCCH monitoring occasions including at least one or both of the first DCI format and/or the second DCI format and included in the M PDCCH monitoring occasions 1001.

In step A3, j may be set to 0.

In step A4, $V_{temp}$ may be set to 0.

In step A5, $V_{temp2}$ may be set to 0.

In step A6, $V_s=\varphi$ may be set. $\Phi$ denotes an empty set.

In step A7, $N^{DL}_{cells}$ may be set to the number of serving cells. The number of serving cells may be the number of serving cells included in the serving cell group 100. The number of serving cells may be the number of serving cells configured for the terminal apparatus 1. In a case that the terminal apparatus 1 is configured with the SCG and a PUCCH 1008 including the HARQ-ACK code book 1000 is transmitted on the uplink carrier included in the primary secondary cell included in the SCG, the number of serving cells may be the number of serving cells included in the SCG. In a case that the terminal apparatus 1 is configured with the SCG and the PUCCH 1008 including the HARQ-ACK code book 1000 is transmitted on the uplink carrier included in the primary cell included in the MCG, the number of serving cells may be the number of serving cells included in the MCG. In a case that the terminal apparatus 1 is configured with a PUCCH group and the PUCCH 1008 including the HARQ-ACK code book 1000 is transmitted on the uplink carrier included in the PUCCH-SCell included in the PUCCH group, the number of serving cells may be the number of serving cells included in the PUCCH group.

In step A8, M may be set to the number M of PDCCH monitoring occasions 1001 associated with the HARQ-ACK code book 1000. The number M of PDCCH monitoring occasions 1001 associated with the HARQ-ACK code book 1000 may include at least the PDCCH monitoring occasions on which some or all of the HARQ-ACKs (HARQ-ACK 1006 and/or HARQ-ACK 1007) included in the HARQ-ACK code book 1000 is detected.

The number M of PDCCH monitoring occasions associated with the HARQ-ACK code book 1000 may be the number of PDCCH monitoring occasions included in the range from the first slot to the second slot. The first slot may be given at least based on some or all of the maximum value of the set of PDCCH-PUCCH processing times corresponding to the DCI format 1003, monitoring occasions for search space sets for which the DCI format 1003 is configured, and/or the slot indexes of the slots in which the PUCCH 1008 is transmitted. The second slot may be given at least based on some or all of the minimum value of the set of PDCCH-PUCCH processing times corresponding to the DCI format 1003, monitoring occasions for search space sets for which the DCI format 1003 is configured, and/or the slot indexes of the slots in which the PUCCH 1008 is transmitted.

The maximum value of the set of PDCCH-PUCCH processing times may be given at least based on some or all of the maximum value of the set of PDCCH processing times corresponding to the DCI format and/or the maximum value of the set of PDSCH processing times corresponding to the DCI format.

The minimum value of the set of PDCCH-PUCCH processing times may be given at least based on a minimum value of a set of PDCCH processing times corresponding to the DCI format and/or a minimum value of a set of PDSCH processing times corresponding to the DCI format.

The first slot may be given at least based on some or all of the PDCCH-PUCCH processing times corresponding to each of the DCI formats 1003. The first slot may be given at least based on the maximum value of the PDCCH-PUCCH processing time corresponding to each of the DCI formats 1003. In other words, the first slot may be given at least based on the maximum value of the PDCCH-PUCCH processing time corresponding to each of some or all of the DCI formats detected in the M PDCCH monitoring occasion 1001 associated with the HARQ-ACK code book 1000.

The second slot may be given at least based on some or all of the PDCCH-PUCCH processing times corresponding to each of the DCI formats 1003. The second slot may be given at least based on the minimum value of the PDCCH-PUCCH processing time corresponding to each of the DCI formats 1003. In other words, the second slot may be given at least based on the minimum value of the PDCCH-PUCCH processing times corresponding to each of some or all of the DCI format detected in the M PDCCH monitoring occasions 1001 associated with the HARQ-ACK code book 1000.

In step A9, the first evaluation formula m<M is evaluated. In a case that the first evaluation formula is true, step A10 may be performed. In a case that the first evaluation formula is false, step A34 may be performed.

In step A10, a second evaluation formula $c < N^{DL}_{cells}$ is evaluated. In a case that the second evaluation formula is true, step A11 may be performed. In a case that the second evaluation formula is false, step A32 may be performed.

In step A11, in a case that, in the PDCCH monitoring occasion m in the serving cell c, the PDCCH 1002 including the DCI format 1003 for scheduling the PDSCH 1004 is received, and/or in the PDCCH monitoring occasion m in the serving cell c, the PDCCH 1002 including the DCI format 1003 indicating the SPS release 1005 is received, then step A12 may be performed.

In step A11, in a case that, in the PDCCH monitoring occasion m in the serving cell c, the PDCCH 1002 including the DCI format 1003 for scheduling PDSCH 1004 is not received or in the PDCCH monitoring occasion m in the serving cell c, the PDCCH 1002 including the DCI format 1003 indicating the SPS release 1005 is not received, then step A30 may be performed.

In step A12, a third evaluation formula $V^{DL}_{C\text{-}DAI,c,m} \leq V_{temp}$ is evaluated. In a case that the third evaluation formula is true, step A13 may be performed. In a case that the third evaluation formula is false, step A14 may be performed.

The value of a Downlink Assingment Index (DAI) given at least based on the PDCCH 1002 detected in the PDCCH monitoring occasion m in the serving cell c. The counter DAI may be included in the first DCI format. The counter DAI may not be included in the first DCI format. The counter DAI may be included in the second DCI format. The counter DAI indicates, in the M PDCCH monitoring occasions 1001 associated with the HARQ-ACK code book 1000, the cumulative number of PDCCHs 1002 detected before the PDCCH monitoring occasion m in the serving cell c (or the counter DAI may be a value at least associated with the cumulative number). In determination of the cumulative number, as the index of each PDCCH 1002 detected in the M monitoring occasions 1001 associated with the HARQ-ACK code book 1000, the serving cell index c may be given first and the PDCCH monitoring occasion m may be given second. In other words, the indexes of PDCCHs 1002 detected in the M monitoring occasions 1001 associated with the HARQ-ACK code book 1000 may be mapped in the order first of the serving cell index c and then of the PDCCH monitoring occasions m (serving cell index first, PDCCH monitoring occasion second mapping).

In step A13, j may be set to j+1.

Step A14 may be a step indicating completion of the operation based on the third evaluation formula in step A12.

In step A15, $V_{temp}$ may be set to $V^{DL}_{C\text{-}DAI,c,m}$.

In step A16, a fourth evaluation formula $V^{DL}_{T\text{-}DAI,m} = \varphi$ may be evaluated. In a case that the fourth evaluation formula is true, step A17 may be performed. In a case that the fourth evaluation formula is false, step A18 may be performed.

$V^{DL}_{T\text{-}DAI,m}$ is the value of the total DAI given at least based on the PDCCH detected in the PDCCH monitoring occasion m in the serving cell c. The total DAI may be included in the first DCI format. The total DAI need not be included in the first DCI format. The total DAI may be included in the second DCI format. The total DAI indicates the cumulative number of PDCCHs 1002 detected before the PDCCH monitoring occasion m in the M PDCCH monitoring occasions 1001 associated with the HARQ-ACK code book 1000 (or the total DAI may be a value at least associated with the cumulative number).

In step A17, $V_{temp2}$ may be set to $V^{DL}_{C\text{-}DAI,c,m}$.

In step A18, step A19 may be performed.

In step A19, $V_{temp2}$ may be set to $V^{DL}_{T\text{-}DAI,m}$.

In step A20, in a case that 1) the higher layer parameter HARQ-ACK-spatial-bundling-PUCCH is not set to true, 2) at least one serving cell in the M PDCCH monitoring occasions 1001 associated with the HARQ-ACK code book 1000 includes at least one monitoring occasion for the search space set configured with monitoring of the second DCI format, and/or 3) the higher layer parameter Number-MCS-HARQ-DL-DCI is set to indicate that one PDSCH in the at least one serving cell includes two transport blocks, then step A21 may be performed.

The higher layer parameter HARQ-ACK-spatial-bundling-PUCCH being not set to true may mean the higher layer parameter HARQ-ACK-spatial-bundling-PUCCH being set to false.

In step A21, $o^{ACK}_a(8j+2(V^{DL}_{C-DAI,c,m}-1))$ may be set to the value of the HARQ-ACK bit corresponding to the first transport block in the serving cell c. The HARQ-ACK bit having a value of 1 may indicate an ACK. The HARQ-ACK bit having a value of 0 may indicate a NACK. The first transport block of the serving cell c may be the first transport block included in the PDSCH 1004 scheduled in accordance with the DCI format included in the PDCCH 1002 detected in the PDCCH monitoring occasion m in the serving cell c.

In step A22, $o^{ACK}_a(8j+2 (V^{DL}_{C-DAI,c,m}-1)+1)$ may be set to the value of the HARQ-ACK bit corresponding to the second transport block in the serving cell c. The second transport block of the serving cell c may be the second transport block included in PDSCH 1004 scheduled in accordance with the DCI format included in the PDCCH 1002 detected in the PDCCH monitoring occasion m in the serving cell c.

In a case that the PDSCH 1004 scheduled in accordance with the DCI format 1003 included in the PDCCH 1002 detected in the PDCCH monitoring occasion m in the serving cell c includes a first transport block and that the PDSCH 1004 does not include the second transport block, to which value of the $o^{ACK}_a(8j+2) (V^{DL}_{C-DAI,c,m}-1)+1)$ is set may be given at least based on 1) whether at least one serving cell in the M PDCCH monitoring occasions 1001 associated with the HARQ-ACK code book 1000 includes at least one monitoring occasion for the search space set configured with monitoring of the second DCI format or not, 2) whether the higher layer parameter Number-MCS-HARQ-DL-DCI is set to indicate that one PDSCH in the at least one serving cell includes two transport blocks or not, and/or 3) whether the higher layer parameter HARQ-ACK-spatial-bundling-PUCCH is set to true or not. $O^{ACK}_a(8j+2 (V^{DL}_{C-DAI,c,m}-1)+1)$ is also referred to as a second HARQ-ACK bit corresponding to the second transport block.

The PDSCH 1004 including the first transport block and not including the second transport block may mean the PDSCH 1004 including one transport block.

In step A22, in a case that 1) the PDSCH 1004 scheduled in accordance with the DCI format 1003 included in PDCCH 1002 detected in the monitoring occasion m of the PDCCH in the serving cell c includes the first transport block and that 2) the PDSCH 1004 does not include the second transport block, then the second HARQ-ACK bit for the second transport block may be set to NACK, and the second HARQ-ACK bit may be set to $o^{ACK}_a(8j+2(V^{DL}_{C-DAI,c,m}-1)+1)$.

In other words, in a case that 1) the PDSCH 1004 scheduled in accordance with the DCI format 1003 included in the PDCCH 1002 detected in the PDCCH monitoring occasion m in the serving cell c includes the first transport block, 2) the PDSCH 1004 does not include the second transport block, 3) at least one serving cell in the M PDCCH monitoring occasions 1001 associated with the HARQ-ACK code book 1000 includes at least one monitoring occasion for the search space set configured with monitoring of the second DCI format, 4) the higher layer parameter Number-MCS-HARQ-DL-DCI is set to indicate that one PDSCH in the at least one serving cell includes two transport blocks, and/or 5) the higher layer parameter HARQ-ACK-spatial-bundling-PUCCH is not set to true, then the second HARQ-ACK bit for the second transport block may be set to NACK and the second HARQ-ACK bit may be set to $O^{ACK}_a(8j+2 (V^{DL}_{C-DAI,c,m}-1)+1)$.

In step A23, $V_s$ may be set to $V_s \cup \{8j+2(V^{DL}_{C-DAI,c,m}-1), 8j+2 (V^{DL}_{C-DAI,c,m}-1)+1\}$. Y∪Z may indicate the union of a set Y and a set Z. {*} may be a set including *.

In step A24, in a case that 1) the higher layer parameter HARQ-ACK-spatial-bundling-PUCCH is set to true, 2) at least one serving cell in the M PDCCH monitoring occasions 1001 associated with the HARQ-ACK code book 1000 includes at least one monitoring occasion for the search space set configured with monitoring of the second DCI format, and/or 3) the higher layer parameter Number-MCS-HARQ-DL-DCI is set to indicate that one PDSCH in the at least one serving cell includes two transport blocks, then step A25 may be performed.

In step A25, $o^{ACK}_a(4j+V^{DL}_{C-DAI,c,m}-1)$ may be set to a value given by a binary AND operation of the first HARQ-ACK bit corresponding to the first transport block in the serving cell c and the second HARQ-ACK bit corresponding to the second transport block in the serving cell c.

In step A25, in a case that 1) the PDSCH 1004 scheduled in accordance with the DCI format 1003 included in PDCCH 1002 detected in the monitoring occasion m of the PDCCH in the serving cell c includes the first transport block, and 2) the PDSCH 1004 does not include the second transport block, then the second HARQ-ACK bit for the second transport block may be set to ACK and the result of the binary AND operation of the first HARQ-ACK bit and the second HARQ-ACK bit may be set to $o^{ACK}_a(4j+V^{DL}_{C-DAI, c, m}-1)$.

In other words, in a case that 1) the PDSCH 1004 scheduled in accordance with the DCI format 1003 included in the PDCCH 1002 detected in the PDCCH monitoring occasion m in the serving cell c includes the first transport block, 2) the PDSCH 1004 does not include the second transport block, 3) at least one serving cell in the M PDCCH monitoring occasions 1001 associated with the HARQ-ACK code book 1000 includes at least one monitoring occasion for the search space set configured with monitoring of the second DCI format, 4) the higher layer parameter Number-MCS-HARQ-DL-DCI is set to indicate that one PDSCH in the at least one serving cell includes two transport blocks, and/or 5) the higher layer parameter HARQ-ACK-spatial-bundling-PUCCH is set to true, then the second HARQ-ACK bit for the second transport block may be set to ACK and the result of the binary AND operation of the first HARQ-ACK bit and the second HARQ-ACK bit may be set to $o^{ACK}_a(4j+V^{DL}_{C-DAI,c,m}-1)$.

In step A25, in a case that 1) the PDSCH 1004 scheduled in accordance with the DCI format 1003 included in PDCCH 1002 detected in the PDCCH monitoring occasion m in the serving cell c includes the first transport block, 2) the PDSCH 1004 does not include the second transport block, and/or 3) the value of $o^{ACK}_a(4j+V^{DL}_{C-DAI,c,m}-1)$ is given by the binary AND operation of the first HARQ-ACK bit and the second HARQ-ACK bit corresponding to the first transport block, then the second HARQ-ACK bit may be set to ACK. Here, the value of $o^{ACK}_a(4j+V^{DL}_{C-DAI,c,m}-1)$ being given by the binary AND operation of the first HARQ-ACK bit and the second HARQ-ACK bit corresponding to the first transport block may mean application of spatial bundling.

In other words, in a case that 1) the PDSCH 1004 scheduled in accordance with the DCI format 1003 included in the PDCCH 1002 detected in the PDCCH monitoring occasion m in the serving cell c includes the first transport block, 2) the PDSCH 1004 does not include the second transport block, 3) at least one serving cell in the M PDCCH monitoring occasions 1001 associated with the HARQ-ACK code book 1000 includes at least one monitoring occasion for the search space set configured with monitoring of the second DCI format, 4) the higher layer parameter Number-MCS-HARQ-DL-DCI is set to indicate that one PDSCH in the at least one serving cell includes two transport blocks, and/or 5) the value of $o^{ACK}_a(4j+V^{DL}_{C-DAI,c,m}-1)$ is given by the binary AND operation of the first HARQ-ACK bit and the second HARQ-ACK bit corresponding to the first transport block, then the second HARQ-ACK bit may be set to ACK.

1) At least based on some or all of 1) whether the PDSCH 1004 scheduled in accordance with the DCI format 1003 included in the PDCCH 1002 detected in the PDCCH monitoring occasion m in the serving cell c includes the first transport block, 2) whether the PDSCH 1004 includes the second transport block, 3) whether at least one serving cell in the M PDCCH monitoring occasions 1001 associated with the HARQ-ACK code book 1000 includes at least one monitoring occasion for the search space set configured with monitoring of the second DCI format, 4) whether the higher layer parameter Number-MCS-HARQ-DL-DCI is set to indicate that one PDSCH in the at least one serving cell includes two transport blocks, and/or 5) whether the higher layer parameter HARQ-ACK-spatial-bundling-PUCCH is set to true, $o^{ACK}_a(8j+2(V^{DL}_{C-DAI,c,m}-1)+1)$ may be set to ACK or NACK.

In a case that 1) the PDSCH 1004 scheduled in accordance with the DCI format 1003 included in the PDCCH 1002 detected in the PDCCH monitoring occasion m in the serving cell c includes the first transport block, 2) the PDSCH 1004 does not include the second transport block, 3) at least one serving cell in the M PDCCH monitoring occasions 1001 associated with the HARQ-ACK code book 1000 includes at least one monitoring occasion for the search space set configured with monitoring of the second DCI format, and 4) the higher layer parameter Number-MCS-HARQ-DL-DCI is set to indicate that one PDSCH in the at least one serving cell includes two transport blocks, then based on whether the higher layer parameter HARQ-ACK-spatial-bundling-PUCCH is set to true, $o^{ACK}_a(8j+2(V^{DL}_{C-DAI,c,m}-1)+1)$ may be set to ACK or NACK.

In a case that 1) the PDSCH 1004 scheduled in accordance with the DCI format 1003 included in the PDCCH 1002 detected in the PDCCH monitoring occasion m in the serving cell c includes the first transport block, 2) the PDSCH 1004 does not include the second transport block, 3) at least one serving cell in the M PDCCH monitoring occasions 1001 associated with the HARQ-ACK code book 1000 includes at least one monitoring occasion for the search space set configured with monitoring of the second DCI format, 4) the higher layer parameter Number-MCS-HARQ-DL-DCI is set to indicate that one PDSCH in the at least one serving cell includes two transport blocks, and/or 5) the higher layer parameter HARQ-ACK-spatial-bundling-PUCCH is not set to true, then $o^{ACK}_a(8j+2(V^{DL}_{C-DAI,c,m}-1)+1)$ may be set to NACK.

At least based on some or all of 1) whether the PDSCH 1004 scheduled in accordance with the DCI format 1003 included in the PDCCH 1002 detected in the PDCCH monitoring occasion m in the serving cell c includes the first transport block, 2) whether the PDSCH 1004 includes the second transport block, 3) whether at least one serving cell in the M PDCCH monitoring occasions 1001 associated with the HARQ-ACK code book 1000 includes at least one monitoring occasion for the search space set configured with monitoring of the second DCI format, 4) whether the higher layer parameter Number-MCS-HARQ-DL-DCI is set to indicate that one PDSCH in the at least one serving cell includes two transport blocks, and/or 5) whether the higher layer parameter HARQ-ACK-spatial-bundling-PUCCH is set to true, the second HARQ-ACK bit may be set to ACK or NACK.

In a case that 1) the PDSCH 1004 scheduled in accordance with the DCI format 1003 included in the PDCCH 1002 detected in the PDCCH monitoring occasion m in the serving cell c includes the first transport block, 2) the PDSCH 1004 does not include the second transport block, 3) at least one serving cell in the M PDCCH monitoring occasions 1001 associated with the HARQ-ACK code book 1000 includes at least one monitoring occasion for the search space set configured with monitoring of the second DCI format, and 4) the higher layer parameter Number-MCS-HARQ-DL-DCI is set to indicate that one PDSCH in the at least one serving cell includes two transport blocks, then based on whether the higher layer parameter HARQ-ACK-spatial-bundling-PUCCH is set to true, the second HARQ-ACK bit may be set to ACK or NACK.

In a case that 1) the PDSCH 1004 scheduled in accordance with the DCI format 1003 included in the PDCCH 1002 detected in the PDCCH monitoring occasion m in the serving cell c includes the first transport block, 2) the PDSCH 1004 does not include the second transport block, 3) at least one serving cell in the M PDCCH monitoring occasions 1001 associated with the HARQ-ACK code book 1000 includes at least one monitoring occasion for the search space set configured with monitoring of the second DCI format, 4) the higher layer parameter Number-MCS-HARQ-DL-DCI is set to indicate that one PDSCH in the at least one serving cell includes two transport blocks, and/or 5) the higher layer parameter HARQ-ACK-spatial-bundling-PUCCH is not set to true, then the second HARQ-ACK bit may be set to NACK.

In step A26, $V_s$ may be set to $V_s \cup \{4j+V^{DL}_{C-DAI,c,m}-1\}$.

In step A27, at least in the M PDCCH monitoring occasions 1001 associated with the HARQ-ACK code book 1000, step A28 may be performed in a case that the monitoring occasion for the search space set configured with monitoring of the second DCI format is not included in any serving cell.

In step A27, in a case that at least one serving cell at least in the M PDCCH monitoring occasions 1001 associated with the HARQ-ACK code book 1000 includes at least one monitoring occasion for the search space set configured with monitoring of the second DCI format and/or that at least the higher layer parameter Number-MCS-HARQ-DL-DCI is not set to indicate that one PDSCH in the at least one serving cell receives two transport blocks, then step A28 may be performed.

In step A28, $o^{ACK}_a(4j+V^{DL}_{C-DAI,c,m}-1)$ may be set to the value of the first HARQ-ACK bit corresponding to the first transport block in the serving cell c. In step A28, $o^{ACK}_a(4j+V^{DL}_{C-DAI,c,m}-1)$ may be set to the value of the HARQ-ACK bit in the serving cell c.

In step A29, $V_s$ may be set to $V_s \cup \{4j+V^{DL}_{C-DAI,c,m}-1\}$.

Step A30 may be a step indicating completion of the operation of step A11.

In step A31, c may be set to c+1.

In step A32, step A10 may be performed.

In step A33, m may be set to m+1.

In step A34, step A9 may be performed.

Whether each of the first HARQ-ACK bit corresponding to the first transport block included in the PDSCH 1004 and the second HARQ-ACK bit corresponding to the second transport block included in the PDSCH is included in the HARQ-ACK code book 1000 or not may be given at least based on some or all of 1) whether higher layer parameter HARQ-ACK-spatial-bundling-PUCCH is set to true or not, 2) whether at least one serving cell in the M PDCCH monitoring occasions 1001 associated with the HARQ-ACK code book 1000 includes at least one monitoring occasion for the search space set configured with monitoring of the second DCI format or not, and/or 3) whether the higher layer parameter Number-MCS-HARQ-DL-DCI is set to indicate that one PDSCH in the at least one serving cell receives two transport blocks or not.

Whether the value given by the binary AND operation of the first HARQ-ACK bit corresponding to the first transport block included in the PDSCH 1004 and the second HARQ-ACK bit corresponding to the second transport block included in the PDSCH 1004 is included in the HARQ-ACK code book 1000 or not may be given at least based on some or all of 1) whether the higher layer parameter HARQ-ACK-spatial-bundling-PUCCH is set to true or not, 2) whether at least one serving cell in the M PDCCH monitoring occasions 1001 associated with the HARQ-ACK code book 1000 includes at least one monitoring occasion for the search space set configured with monitoring of the second DCI format or not, and/or 3) whether the higher layer parameter Number-MCS-HARQ-DL-DCI is set to indicate that one PDSCH in the at least one serving cell receives two transport blocks or not.

In step A35, a fifth evaluation formula $V_{temp2} < V_{temp}$ may be performed. In a case that the fifth evaluation formula is true, step A36 may be performed. In a case that the fifth evaluation formula is false, step A37 may be performed.

In step A36, j may be set to j+1.

Step A37 may be a step indicating completion of step A35.

In step A38, in a case that 1) the higher layer parameter HARQ-ACK-spatial-bundling-PUCCH is not set to true, 2) at least one serving cell in the M PDCCH monitoring occasions 1001 associated with the HARQ-ACK code book 1000 includes at least one monitoring occasion for the search space set configured with monitoring of the second DCI format, and/or 3) the higher layer parameter Number-MCS-HARQ-DL-DCI is set to indicate that one PDSCH in the at least one serving cell includes two transport blocks, then step A39 may be performed.

In step A39, an $O_{ACK}$ may be set to 2 (4j+$V_{temp2}$).

In step A40, in a case that at least the higher layer parameter HARQ-ACK-spatial-bundling-PUCCH is set to true, step 41 may be performed.

In step A40, in a case that at least the serving cell in the M PDCCH monitoring occasions 1001 associated with the HARQ-ACK code book 1000 includes no monitoring occasion for the search space set configured with monitoring of the second DCI format, step A41 may be performed.

In step A40, in a case that at least one serving cell in the M PDCCH monitoring occasions 1001 associated with the HARQ-ACK code book 1000 includes a monitoring occasion for the search space set configured with monitoring of the second DCI format and/or 3) the higher layer parameter Number-MCS-HARQ-DL-DCI is not set to indicate that one PDSCH in the at least one serving cell includes two transport blocks, then step A42 may be performed.

In step A41, $O_{ACK}$ may be set to 4j+$V_{temp2}$.

The length $O_{ACK}$ of the sequence of the HARQ-ACK code book 1000 may be given at least based on some or all of 1) whether the higher layer parameter HARQ-ACK-spatial-bundling-PUCCH is set to true or not 2) at least one serving cell in the M PDCCH monitoring occasions 1001 associated with the HARQ-ACK code book 1000 includes at least one monitoring occasion for the search space set configured with monitoring of the second DCI format or not, and/or 3) the higher layer parameter Number-MCS-HARQ-DL-DCI is not set to indicate that one PDSCH in the at least one serving cell receives two transport blocks or not.

The higher layer parameter Number-MCS-HARQ-DL-DCI being set to indicate that one PDSCH in the at least one serving cell receives two transport blocks may mean that the second DCI format includes an MCS field for the second transport block. The higher layer parameter Number-MCS-HARQ-DL-DCI being set to indicate that one PDSCH in the at least one serving cell receives two transport blocks may mean that the PUCCH generates a first HARQ-ACK corresponding to the first transport block and a second HARQ-ACK corresponding to the second transport block. The higher layer parameter Number-MCS-HARQ-DL-DCI indicates whether the second DCI format includes the MCS field for the second transport block. In a case that the higher layer parameter Number-MCS-HARQ-DL-DCI is set to a third prescribed value, the second DCI format includes the MCS field for the second transport block. In a case that the higher layer parameter Number-MCS-HARQ-DL-DCI is not set to the third prescribed value, the second DCI format does not include the MCS field for the second transport block.

In step A42, for $i_N$ satisfying $i_N \in \{0, 1, \ldots, O^{ACK}-1\} \mathbf{Y} V_s$, $o^{ACK}_a(i_N)$ may be set to the value of NACK. V$\mathbf{Y}$W may indicate a set of elements obtained by subtracting elements included in a set W from a set V. V$\mathbf{Y}$W may be a set difference of V for W.

In step A43, in a case that the PDSCH (SPS PDSCH) is configured to be received, the PDSCH being scheduled by a configured grant in one or multiple slots in the M PDCCH monitoring occasions 1001 associated with the HARQ-ACK code book 1000, and that transmission of the SPS PDSCH is activated, then step A44 may be performed.

In step A44, $O^{ACK}$ may be set to $O^{ACK}+1$. In step A44, $O^{ACK}$ may be set to $O^{ACK}+N_{SPS}$. The $N_{SPS}$ may be the number of SPS PDSCHs configured to be received in the M PDCCH monitoring occasions 1001 associated with the HARQ-ACK code book 1000.

In step A45, $o^{ACK}_a(o^{ACK}_a-1)$ may be set to the value of the HARQ-ACK bit corresponding to the transport block included in the SPS PDSCH. In step A45, $o^{ACK}_a (o^{ACK}_a - i_{SPS})$ may be set to the value of the HARQ-ACK bit corresponding to the transport block included in the SPS PDSCH. $i_{SPS}$ may satisfy the condition $i_{SPS} \in \{0, 1, \ldots, N_{SPS}-1\}$. In step A45, $o^{ACK}_a(o^{ACK}_a-1)$ may be set to a value given by the binary AND operation of the HARQ-ACK bit corresponding to the transport block included in each of one or multiple SPS PDSCHs configured to be received in the M PDCCH monitoring occasions 1001 associated with the HARQ-ACK code book 1000.

Step A46 may be a step indicating completion of the operation of step A43.

The first to fifth evaluation formulae are also referred to as evaluation formulae. The evaluation formula being true may indicate that the evaluation formula being satisfied. The evaluation formula being false may indicate that the evaluation formula is not true. The evaluation formula being false may indicate that the evaluation formula is not satisfied.

Various aspects of apparatuses according to one aspect of the present embodiment will be described below.

(1) To accomplish the object described above, aspects of the present invention are contrived to provide the following measures. In other words, a first aspect of the present invention is a terminal apparatus including a receiver configured to monitor a PDCCH including a DCI format, and a transmitter configured to transmit an HARQ-ACK on a PUCCH, wherein a size $O^{ACK}$ of an HARQ-ACK code book of the HARQ-ACK is given at least based on some or all of 1) whether at least one serving cell in M PDCCH monitoring occasions associated with the HARQ-ACK code book includes at least one monitoring occasion for a search space set configured with monitoring of the DCI format or not, and/or 2) whether a higher layer parameter Number-MCS-HARQ-DL-DCI is set to a prescribed value for the at least one serving cell or not.

The prescribed value may be set to indicate that two transport blocks are included in one PDSCH in the at least one serving cell. The one PDSCH may be scheduled in accordance with the DCI format.

(2) In the first aspect of the present invention, the size $O^{ACK}$ is given at least based on whether a higher layer parameter HARQ-ACK-spatial-bundling-PUCCH is set to true or not, the receiver receives a first transport block and a second transport block included in a PDSCH scheduled by the PDCCH; and in a case that the higher layer parameter HARQ-ACK-spatial-bundling-PUCCH is not set to true, the HARQ-ACK code book includes a first HARQ-ACK bit corresponding to the first transport block and a second HARQ-ACK bit corresponding to the second transport block, and in a case that the higher layer parameter HARQ-ACK-spatial-bundling-PUCCH is set to true, the HARQ-ACK code book includes bits provided by a binary AND operation of the first HARQ-ACK bit corresponding to the first transport block and the second HARQ-ACK bit corresponding to the second transport block.

(3) A second aspect of the present invention is a base station apparatus including a transmitter configured to transmit a PDCCH including a DCI format, and a receiver configured to receive an HARQ-ACK on a PUCCH, wherein a size $O^{ACK}$ of an HARQ-ACK code book of the HARQ-ACK is given at least based on some or all of 1) whether at least one serving cell in M PDCCH monitoring occasions associated with the HARQ-ACK code book includes at least one monitoring occasion for a search space set configured with monitoring of the DCI format or not, and/or 2) whether a higher layer parameter Number-MCS-HARQ-DL-DCI is set to a prescribed value for the at least one serving cell or not.

The prescribed value may be set to indicate that two transport blocks are included in one PDSCH in the at least one serving cell. The one PDSCH may be scheduled in accordance with the DCI format.

(4) In the second aspect of the present invention, the size $O^{ACK}$ is given at least based on whether a higher layer parameter HARQ-ACK-spatial-bundling-PUCCH is set to true or not, the transmitter transmits a first transport block and a second transport block included in a PDSCH scheduled by the PDCCH; and in a case that the higher layer parameter HARQ-ACK-spatial-bundling-PUCCH is not set to true, the HARQ-ACK code book includes a first HARQ-ACK bit corresponding to the first transport block and a second HARQ-ACK bit corresponding to the second transport block, and in a case that the higher layer parameter HARQ-ACK-spatial-bundling-PUCCH is set to true, the HARQ-ACK code book includes bits provided by a binary AND operation of the first HARQ-ACK bit corresponding to the first transport block and the second HARQ-ACK bit corresponding to the second transport block.

(5) A third aspect of the present invention is a terminal apparatus including a receiver configured to monitor a PDCCH including a DCI format, and a transmitter configured to transmit an HARQ-ACK on a PUCCH, wherein the terminal apparatus receives a first transport block included in a PDSCH scheduled by the PDCCH, the HARQ-ACK is given at least based on a first HARQ-ACK bit corresponding to the first transport block and a second HARQ-ACK bit corresponding to a second transport block, the transmitter generates the second HARQ-ACK bit at least based on some or all of 1) whether at least one serving cell in M PDCCH monitoring occasions includes at least one monitoring occasion for a search space set configured with monitoring of the DCI format or not, 2) a higher layer parameter Number-MCS-HARQ-DL-DCI is set to a prescribed value for the at least one serving cell or not, and/or 3) values of a higher layer parameter HARQ-ACK-spatial-bundling-PUCCH.

(6) In the third aspect of the present invention, in a case that 1) at least one serving cell in the M PDCCH monitoring occasions includes at least one monitoring occasion for a search space set configured with monitoring of a DCI format, and 2) the higher layer parameter Number-MCS-HARQ-DL-DCI is set to the prescribed value for the at least one serving cell, and 3) the higher layer parameter HARQ-ACK-spatial-bundling-PUCCH is set to a second prescribed value, the transmitter generates an ACK as the second HARQ-ACK bit.

(7) A fourth aspect of the present invention is a base station apparatus including a transmitter configured to transmit a PDCCH including a DCI format, and a receiver configured to receive an HARQ-ACK on a PUCCH, wherein the terminal apparatus transmits a first transport block included in a PDSCH scheduled by the PDCCH, the HARQ-ACK is given at least based on a first HARQ-ACK bit corresponding to the first transport block and a second HARQ-ACK bit corresponding to a second transport block, the receiver receives the HARQ-ACK at least based on some or all of 1) whether at least one serving cell in M PDCCH monitoring occasions includes at least one monitoring occasion for a search space set configured with monitoring of the DCI format or not, 2) a higher layer parameter Number-MCS-HARQ-DL-DCI is set to a prescribed value for the at least one serving cell or not, and/or 3) values of a higher layer parameter HARQ-ACK-spatial-bundling-PUCCH.

(8) In the fourth aspect of the present invention, in a case that 1) the at least one serving cell in the M PDCCH monitoring occasions includes at least one monitoring occasion for a search space set configured with monitoring of a DCI format, and 2) the higher layer parameter Number-MCS-HARQ-DL-DCI is set to the prescribed value for the at least one serving cell, and 3) the higher layer parameter HARQ-ACK-spatial-bundling-PUCCH is set to a second prescribed value, the receiver receives the HARQ-ACK based on an ACK being generated as the second HARQ-ACK bit.

(9) The fifth aspect of the present invention is a terminal apparatus including a receiver configured to receive a PDCCH including a DCI format, and a transmitter configured to transmit a PUCCH, wherein, in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQtiming-indicator field, and a length of each of the slots is given based on a subcarrier spacing configuration of the PUCCH.

(10) In the fifth aspect of the present invention, the subcarrier spacing configuration of the PUCCH is the subcarrier spacing configuration configured for a band in which the PUCCH is transmitted.

(11) The sixth aspect of the present invention is a base station apparatus including: a transmitter configured to transmit a PDCCH including a DCI format; and a receiver configured to receive a PUCCH, wherein in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

(12) In the sixth aspect of the present invention, the subcarrier spacing configuration of the PUCCH is the subcarrier spacing configuration configured for a band in which the PUCCH is transmitted.

(13) The seventh aspect of the present invention is a communication method used for a terminal apparatus, the communication method including the steps of: receiving a PDCCH including a DCI format; and transmitting a PUCCH, wherein in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

(14) The eighth aspect of the present invention is a communication method used for a base station apparatus, the communication method including the steps of: transmitting a PDCCH including a DCI format; and receiving a PUCCH, wherein in a case that the DCI format schedules a PDSCH and that a last OFDM symbol of the PDSCH is mapped in a first slot, the PUCCH is transmitted in a second slot, the number of slots from the first slot to the second slot is given based on a PDSCH-to-HARQ-timing-indicator field, and a length of each of the slots is given based on a subcarrier spacing configuration of the PUCCH.

Each of a program running on a base station apparatus 3 and a terminal apparatus 1 according to an aspect of the present invention may be a program that controls a Central Processing Unit (CPU) and the like, such that the program causes a computer to operate in such a manner as to realize the functions of the above-described embodiment related to the aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group needs to have a complete set of functions or functional blocks of the base station apparatus 3. Furthermore, the terminal apparatus 1 according to the above-described embodiment can also communicate with the base station apparatus as the aggregation.

Moreover, the base station apparatus 3 according to the above-described embodiment may be an Evolved Universal Terrestrial Radio Access Network (EUTRAN) and/or a NextGen RAN (NG-RAN) or NR RAN. Moreover, the base station apparatus 3 according to the above-described embodiment may have some or all of the functions of a higher node for an eNodeB and/or a gNB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal apparatus in a wireless communication system, the terminal apparatus comprising:
   a receiver configured to receive a physical downlink control channel (PDCCH) including a downlink control information (DCI) format; and
   a transmitter configured to transmit a physical uplink control channel (PUCCH), wherein in a case that the DCI format schedules a physical downlink shared channel (PDSCH) and that a last orthogonal frequency division multiplexing (OFDM) symbol of the PDSCH is mapped in a first slot;
   the PUCCH is transmitted in a second slot,
   a number of slots from the first slot to the second slot is given based on a PDSCH-to-hybrid automatic repeat request (PDSCH-to-HARQ)-timing-indicator field, and
   a length of each of the slots is given based on a subcarrier spacing configuration of the PUCCH.

2. The terminal apparatus according to claim 1, wherein
   The subcarrier spacing configuration of the PUCCH is a subcarrier spacing configuration that is configured for a band in which the PUCCH is transmitted.

3. A base station apparatus in a wireless communication system, the base station apparatus comprising:
   a transmitter configured to transmit a physical downlink control channel (PDCCH) including a downlink control information (DCI) format; and
   a receiver configured to receive a physical uplink control channel (PUCCH), wherein in a case that the DCI format schedules a physical downlink shared channel (PDSCH) and that a last orthogonal frequency division multiplexing (OFDM) symbol of the PDSCH is mapped in a first slot;
   the PUCCH is received in a second slot,
   a number of slots from the first slot to the second slot is given based on a PDSCH-to-hybrid automatic repeat request (PDSCH-to-HARQ)-timing-indicator field, and
   a length of each of the slots is given based on a subcarrier spacing configuration of the PUCCH.

4. The base station apparatus according to claim 3, wherein the subcarrier spacing configuration of the PUCCH is a subcarrier spacing configuration that is configured for a band in which the PUCCH is received.

5. A communication method used for a terminal apparatus in a wireless communication system, the communication method comprising:
   receiving a physical downlink control channel (PDCCH) including a downlink control information (DCI) format; and
   transmitting a physical uplink control channel (PUCCH), wherein in a case that the DCI format schedules a physical downlink shared channel (PDSCH) and that a last orthogonal frequency division multiplexing (OFDM) symbol of the PDSCH is mapped in a first slot;
   the PUCCH is transmitted in a second slot,
   a number of slots from the first slot to the second slot is given based on a PDSCH-to-hybrid automatic repeat request (PDSCH-to-HARQ)-timing-indicator field, and
   a length of each of the slots is given based on a subcarrier spacing configuration of the PUCCH.

6. A communication method used for a base station apparatus in a wireless communication system, the communication method comprising:
   transmitting a physical downlink control channel (PDCCH) including a downlink control information (DCI) format; and
   receiving a physical uplink control channel (PUCCH), wherein in a case that the DCI format schedules a physical downlink shared channel (PDSCH) and that a last orthogonal frequency division multiplexing (OFDM) symbol of the PDSCH is mapped in a first slot;
   the PUCCH is received in a second slot,
   a number of slots from the first slot to the second slot is given based on a PDSCH-to-hybrid automatic repeat request (PDSCH-to-HARQ)-timing-indicator field, and
   a length of each of the slots is given based on a subcarrier spacing configuration of the PUCCH.

* * * * *